United States Patent [19]

Baker

[11] Patent Number: 4,866,778
[45] Date of Patent: Sep. 12, 1989

[54] INTERACTIVE SPEECH RECOGNITION APPARATUS

[75] Inventor: James K. Baker, West Newton, Mass.

[73] Assignee: Dragon Systems, Inc., Newton, Mass.

[21] Appl. No.: 895,488

[22] Filed: Aug. 11, 1986

[51] Int. Cl.⁴ .............................................. G10L 7/08
[52] U.S. Cl. .................................... 381/43; 364/513.5
[58] Field of Search ............................. 364/513.5, 513; 381/41–46, 51–53, 110; 367/198; 369/24–25

[56] References Cited

U.S. PATENT DOCUMENTS

| 4,022,080 | 5/1977 | Bachmann | 369/24 |
| 4,093,831 | 6/1978 | Sharp et al. | 369/25 |
| 4,277,644 | 7/1981 | Levinson et al. | 364/513.5 |
| 4,286,115 | 8/1981 | Sakoe | 381/43 |
| 4,712,243 | 12/1987 | Ninomiya et al. | 381/43 |
| 4,718,092 | 1/1988 | Klovstad | 381/43 |
| 4,783,803 | 11/1988 | Baker et al. | 381/43 |

FOREIGN PATENT DOCUMENTS 56-2039  1/1981  Japan .

OTHER PUBLICATIONS

Nassimbene, "Speech Input Technique for Data Entry to Word Processing Equipment", IBM Technical Disclosure Bulletin, vol. 22, No. 7, 12/79, pp. 2891–2892.
Businesssoft, Inc., "Mind Reader", p. 8.

Primary Examiner—Gary V. Harkcom
Assistant Examiner—John A. Merecki
Attorney, Agent, or Firm—Edward W. Porter

[57] ABSTRACT

A speech recognition system which can perform multiple recognition passes on each word. If the recognizer is correct in its first pass, the operator may abort later passes by either pressing a key or speaking the next word. Otherwise, the operator may either wait for a second recognition pass to be performed against a larger vocabulary, or may specify one or more initial letters causing the second recognition pass to be performed against a vocabulary substantially restricted to words starting with those initial letters. Each time the user adds an additional letter to the initial string, any previous recognition is aborted and the re-recognition process is started anew with the new string. If the user types a control character after the initial string, then the string itself is used as the output of the recognizer. In one embodiment, a language model limits a relatively small vocabulary used in the first pass to the words most likely to occur given the language context of the dictated word. The system may also be used as an interactive transcription system for prerecorded speech and can operate on either discrete utterances or continuous speech. When used with prerecorded speech, the system displays the best scoring words of a recognition to the user, and, when the user choses a desired word from such a display, the system employs the portion of prerecorded speech matched against the chosen word to help determine where in that prerecorded speech the system should look for the next word to recognize.

29 Claims, 17 Drawing Sheets

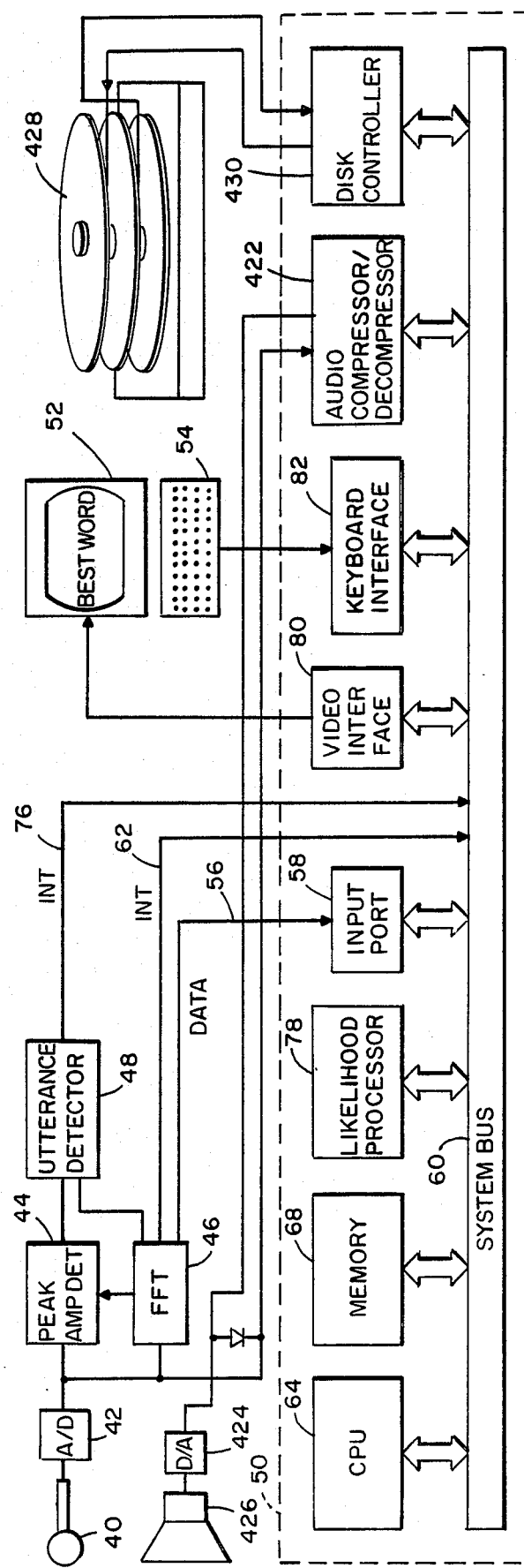
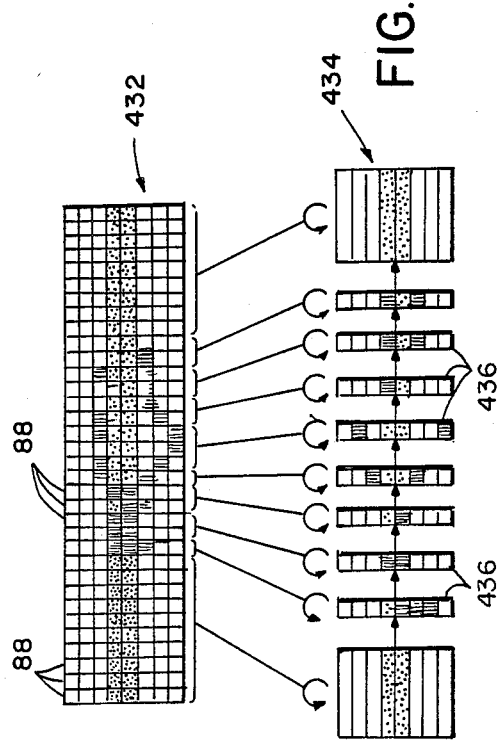
FIG. 1
FIG. 2

FIG. 9

```
1   main ( )
2   /*----------------------------------------------------*
3   {
4   BEGIN:
6       second_display_flag = NO;
7       wordstart = NULL;
8       nextwordstart = NULL;
9       word = NULL;
10  NEW_UTT:
11      clear (initial_string);
12      get_language_model_vocabulary (word);
13      while (wordstart == NULL){
14          get_input ( );
15          if (restart==2) goto LOAD2;
16      }
17      prefilter (wordstart);
17.5    found = NO;
18      for (frame=wordstart; !found; frame++) {
19          score_frame (found, choice);
20          get_input ( );
21          if (restart==1) goto NEW UTT;
22          if (restart==2) goto LOAD2;
23      }
24      display_choices (choice);
25  LOAD2:
26      get_alphabetically_filtered_vocabulary (initial_string);
27      while (wordstart==NULL){
28          get_input( )
29          if(restart==1) goto NEW UTT
30          if(restart==2)
31      }
32      prefilter (wordstart);
32.5    found = NO;
33      for (frame=wordstart; !found; frame++) {
34          score_frame (found, l2choice);
35          get_input ( );
36          if (restart==1) goto NEW_UTT;
37          if (restart==2) goto LOAD2;
38          :
39          :
40      if (second_display_flag) {
41          erase_choices_if_any ( );
42          for (i=0; i<=L2choice [0]; i++)
43              choice [i] = L2choice [i];
44          display_choices (choice);
45          second_display_flag = NO;
46      }
47      for(;;){
48          get_input ( );
49          if (restart==1) goto NEW_UTT;
50          if (restart==2) goto LOAD2;
51      }
52  }
```

FIG. 10

```
1    get input()
2    /*------------------------------------------------------*/
3    {
3.5    restart = NULL;
4      if(wordstart!=nextwordstart) {
5          wordstart=nextwordstart;
6          if(choices_displayed()) {
7              key='l';
8              voice_confirm=YES;
9          }
10         else {
11             key=UNDEF;
12             voice confirm=NO;
13         }
14     else if(kbhit()) {
15         key= getch();
16         voice_confirm=NO;
17     }
18     else key=UNDEF;
19     if(key!=UNDEF) handle_response(key);
20   }
```

FIG. 11

```
1   handle_response(key)
2   /*---------------------------------------------------------*/
3   int16 key;
4   {
5     stcd_i(&key, &keynumber);
6     if(choices_displayed() && 1<=key&&key<=choice[0]) {
7         erase_choices_if_any();
7.5       word = choice[keynumber];
8         pass_to_application(word);
9         second_display_flag = NO;
10        wordstart=NULL;
11        if(voice_confirm==NO)nextwordstart=NULL;
12        restart = 1;
13        return;
14    }
15    if (key=='*') {
16        erase_choices_if_any();
17        prompt("RUNNING RECOGNITION ON FULL VOCABULARY");
18        second_display_flag = YES;
19        restart=0;
20        return;
21    }
22    if (key=='DELETE') {
23        erase_choices_if_any();
24        second_display_flag = NO;
25        wordstart = nextwordstart = NULL;
26        restart = 1;
27        return;
28    }
29    if ('a'<=tolower(key)&&tolower(key)<='z') {
31        erase_choices_if_any();
35        add_key_to_end_of_string(initial_string_key);
36        second display flag = YES;
37        restart = 2;
38        return;
39    }
51    if(key==' ') {
52        erase_choices_if_any();
53        word=word_id_of(initial_string);
56        pass_initial_string_to_application(initial_string);
58        second_display_flag = NO;
59        wordstart=nextwordstart=NULL;
60        restart = 1;
61        return;
62    }
63  }
```

FIG. 12

```
1   get_language_model_vocabulary[word]
2   /*----------------------------------------------------*/
3   int_word;
4   {
5     prefilter_vocab_ptr=lang_model[word];
6   }
```

FIG. 13

```
1   get_alphabetically_filtered_vocabulary(initial string)
2   /*----------------------------------------------------*/
3   char *initial_string;
4   {
5     if(strcmp(initial_string," ")==0){
6         prefilter_vocab_ptr = whole_vocab_ptr;
7     }else{
8         sub_vocab_start =
9             first_word_matching(initial_string, vocab_start);
10        sub_vocab_end =
11            first_word_not_matching(initial_string, vocab_start);
12        prefilter_vocab_ptr =
13            make_prefilter_vocab (
14            sub_vocab_start, sub_vocab_end);
15    }
16  }
```

FIG. 14

```
1   record_utterance()
2   /*----------------------------------------------------*/
4   {
5     nextwordstart=writeptr;
7   }
```

FIG. 15

```
1    get_choices(choice)
2    /*----------------------------------------------------*/
2.5  int 16 *choice;
3    {
4      choice[0]=0;
5      for(i=1;i<=4;i++) {
6          if(endscore_ord[i]<threshold) {
7              choices[i]=endscore_ord[i];
8              choice[0] = i;
9          }
10         else break;
12     }
11   }
```

FIG. 16

```
1   for(i=1; i<=L2choice[0]; i++)
2     choice[choice[0]+i] = L2choice[i];
3   choice[0] += L2choice[0];
4   display_choices(choices);
```

FIG. 17

```
1    main
2    /*----------------------------------------------------*/
5    {
4    BEGIN:
6       word = NULL;
7       wordstart = bigwriteptr = bigstart;
9    NEW_UTT;
10      response_time_limit = NULL;
11      clear(initial_string);
12      get_language_model_vocabulary(word);
13      get_frames();
14      prefilter(wordstart);
14.5    found = NO;
15      for (frame = wordstart; !found; frame++)
16          score_frame(found,choice,wordend);
17      display_choices(choice);
18      response_time_limit = time+RTIME;
19      }
20   LORD2:
21      get_alphabetically_filtered_vocabulary(initial_string);
22      prefilter(wordstart);
22.5    found = NO;
23      for (frame = wordstart; ! found; frame++) {
24          score_frame(found,L2choice,L2wordend);
26          check_for_response();
27          if (restart==1) goto NEW_UTT;
28          if (restart==2) goto LOAD2;
28A         if(!response time()&&response_time_limit!=NULL);
28B             goto TIME_OUT;
29          }
30      }
31      if(!choices_displayed()) {
33              for(i=0;i<=l2choice[0]; i++){
34                  choice[i] = L2choice[i];
35                  wordend[i] = L2wordend[i];
36              };
37              display_choices(choices);
38              response_time_limit = time+RTIME;
39      }
40      while (response time()) {
41          check_for_response();
42          if (restart==1 goto NEW_UTT;
43          if (restart==2 goto LOAD2;
44      }
44.5 TIME OUT
45      key = l;
46      handle_response(key);
47      goto NEW_UTT;
48   }
```

FIG. 18

```
1   get frames()
2   /*----------------------------------------------*/
5   {
6     for(;;){
7         if(wordstart is within fblock lng of bigwriteptr()){
8             if(disk not at eof()){
9                 read fblock from file(audiofileno,
10                    *file blk ptr,FBLOCK LNG;
11                if(playback)
12                    play aloud from file(audiofileno,
13                        calc fileadr of(wordstart),
14                        FBLOCK LNG);
14.5              return;
15            }else if(disk at eof())}
16                if(playback)}
17                    prompt("PLAYBACK DONE");
18                    exit program();
18.5              }
19                if(insert)
20                    prompt("WAITING FOR MORE SPEECH");
21            }
22        else return;
22.5      }
23    }
24  }
```

FIG. 19

```
1    check for response()
2    /*----------------------------------------------*/
4    {
4.5    restart = NULL;
5      if(voice response){
6          reset(voice response);
6.5        prefilter vocab ptr = response vocab ptr;
7          prefilter(smallbuffstart);
8          for (frame = smallbuffstart;! found; frame++)
9              score frame(found,r choice,r wordend);
10         response = r choice[1];
11         key = response key(response);
12         keystring = response keystring(response);
21         handle response(key);
23     }else if(kbhit()){
24         key = getch();
25         strcpy(keystring,key);
26         handle response(key);
27     }
28   }
```

FIG. 20

```
1   handle response(key)
2   /*----------------------------------------------------------*/
3   char key;
5   {
6     stcd i(key, &keynumber);
7     if (1<=key&&key<=choice[0]) {
8         word = choice[keynumber];
9         wordstart = wordend[keynumber];
10        erase choices if any();
11        pass to application(word);
12        restart = 1;
13        return;
14    }
15    if (key=='*'){
15.5      erase choices if any();
16        response time limit = NULL;
17        prompt("RUNNING RECOGNITION ON FULL VOCABULARY");
18        restart = 0;
19        return;
20    }
21    if ('a'<=tolower(key) && tolower(key)<='z') {
22        erase choices if any();
22.5      response time limit = NULL;
23        add to end of string(initial string,keystring);
24        restart = YES;
25        return;
26    }
27    if(key==' '); {
28        erase choices if any();
29        word = word id of(initial string)
32        pass initial string to application(word);
34        restart = 1;
35        return;
36    }
41  }
```

FIG. 21

```
1   read_fblock_from_file(audiofileno, file_blk_ptr);
2   /*--------------------------------------------------*/
3   int 16 audiofileno;
4   int 32 file_blk_ptr;
5   {
6     fblock_no = (int 16)(bigwriteptr-&bigstart)/FBLOCK LNG;
7     fblock_fileadr[fblock_no] = file_fblock_ptr;
8     convert_audio_and_place_in_framebuffer(audiofileno,
9         file_fblock_ptr, FBLOCK_LNG);
10    file_fblock_ptr = lseek(audiofileno,OL,1);
11  }
```

FIG. 22

```
1    long calc_fileadr_or(frame)
2    /*--------------------------------------------------*/
2.5  int 16  frame,
3    {
3.5    framemaker = frame - &bigstart;
4      fblock_no = truncate(framenumber/FBLOCK_LNG);
5      extra_bytes = BYTES_PER_FRAME *
6          modulus(framenumber, FBLOCK_LNG);
7      return(fblock_fileadr [fblock]+ extra_bytes);
8    }
```

FIG. 23

```
1   utterance_interupt_routine()
2   /*--------------------------------------------------*/
3   {
4     if(response_time()){
5         enable_recording_in_small_buffer();
7         voice_response = YES;
8     }
9   }
```

FIG. 24

```
1   block 288() double prime()
2   /*------------------------------------------------*/
3   {
4     if(current node==current word.endnode &&
4.5      duration==expected duration) {
6          compensated endscore = current node.score;
7          for(i=current node.word start time; i<=frame; i++)
8              compensated endscore += norm [i];
9          compensated endscore /=
10             (frame - current node.word start time);
13         fourth worst endscore = 0;
14         already a bestword = NO;
15         for(i=1; i<=4; i++) {
16             if(endscore[i] >fourth worst endscore){
17                 fourth worst endscore = endscore[i];
18                 fourth worst endscore index = i;
19             }
20             if (current word == bestword[i])
21                 endsore[i] = compensated endscore;
22                 endframe[i] = current frame;
23                 already a bestword = YES;
24             }
25         }
26         if(!already a bestword &&
27            compensated endscore <=
27.5          endscore[fourth worst endscore index])
28             endscore[fourth worst endscore index] =
28.5              compensated endscore;
29             endframe[fourth worst endscore index] = current frame;
30             bestword[fourth worst endscore index] = current word;
31         }
32   }
```

FIG. 25

```
1   get wordends(choice, wordend)
2   /*------------------------------------------------*/
2.5 int 16 *choice;
2.6 frame *wordend;
3   {
4     f(i=1; i<=choice[0]; ++) {
5         wordend[x]=endframe ord[x];
6     }
7   }
```

INTERACTIVE SPEECH RECOGNITION APPARATUS

FIELD OF THE INVENTION

The present invention relates to apparatus for speech recognition of the type in which a sequence of speech sounds are identified as corresponding to one or more specific words.

BACKGROUND OF THE INVENTION

There has long been a desire to have machines capable of responding to human speech, such as machines capable of obeying human commands and machines capable of transcribing human dictation. Such machines would greatly increase the speed and ease with which humans communicate with computers and the speed and ease with which they record and organize their own words and thoughts.

Due to recent advances in computer technology and speech recognition algorithms, speech recognition machines have begun to appear in the past several decades, and have become increasingly more powerful and less expensive. For example, the assignee of the present application has publically demonstrated speech recognition software which runs on popular personal computers and which requires little extra hardware except for an inexpensive microphone, an analog-to-digital converter, and a relatively inexpensive microprocessor to perform simple signal processing. This system is capable of providing speaker dependent, discrete word recognition for vocabularies of up to two thousand words at any one time, and many of its features are described in U.S. patent application Ser. No. 797,249, U.S. Pat. No. 4,783,803 entitled "Speech Recognition Apparatus and Method", which is assigned to the assignee of the present application, and which is incorporated herein by reference.

Most present speech recognition systems operate by matching an acoustic description of words in their vocabulary against an acoustic description of an utterance to be recognized. In many such systems, the acoustic signal generated by the utterance to be recognized is converted by an A/D converter into a digital representation of the successive amplitudes of the audio signal created by the speech. Then that signal is converted into a frequency domain signal which consists of a sequence of frames, each of which gives the amplitude of the speech signal in each of a plurality of frequency bands. Such systems commonly operate by comparing the sequence of frames produced by the utterance to be recognized with a sequence of nodes, or frame models, contained in the acoustic model of each word in their vocabulary.

Originally the performance of such frame matching systems was poor, since the sounds of a given word are rarely, if ever, spoken in exactly the same speed or manner. However, two major techniques have been developed in the prior art which have greatly improved the performance of such systems. The first is probabilistic matching, which determines the likelihood that a given frame of an utterance corresponds to a given node in an acoustic word model. It does this not only as a function of how closely the amplitudes of the frame's individual frequency bands match the expected frequencies of the given node, but also as a function of how the deviation between the actual and expected amplitudes compares to the expected deviations for such values. Such probabilistic matching provides a much greater ability to deal with the variations which occur in different utterances of the same word, and a much greater ability to deal with the noise commonly present during speech recognition tasks.

The second major technique which greatly improves the performance of such frame matching systems is that of dynamic programming. Stated simply, dynamic programming provides a method to find an optimal or near optimal match between the sequence of frames produced by an utterance and the sequence of nodes contained in the model of a word. It does this by effectively expanding and contracting the duration of each node in the acoustic model of a word to compensate for the natural variations in the durations of speech sounds which occur in different utterances of the same word. A more detailed discussion of the application of dynamic programming to speech recognition is contained in the above mentioned application Ser. No. 797,249, and in J. K. Baker's article entitled "Stochastic Modeling for Automatic Speech Recognition" in the book Speech Recognition edited by D. R. Reddy and published by Academic Press, New York, N.Y., in 1975.

A major problem in speech recognition is that of reducing the tremendous amount of computation it requires, so that recognition can be preformed in a reasonable time on relatively inexpensive computer hardware. Since many speech recognition systems operate by comparing a given spoken utterance against each word in its vocabulary, and since each such comparison can require thousands of computer instructions, the amount of computation required to recognize an utterance tends to grow as does the vocabulary. Thus the problem of making speech recognition computationally efficient is made even more difficult in systems designed to recognize the large vocabularies necessary to make speech recognition useful for the transcription of normal language.

The prior art has developed a variety of methods for dealing with the excessive computational demands introduced by large vocabulary recognition. One such method used is to provide the system with an artificial grammer which limits the vocabulary which the system can recognize at any one time to a sub-set of the overall vocabulary. As word phrases are recognized, their grammatical classification in an artifical grammer are determined and used to advance the grammer to another state in which another sub-vocabulary of words can be recognized. Although this technique does an excellent job of reducing the system's computational demands, it prevents users from speaking in a natural manner.

Another prior art technique for making large vocabulary recognition more efficient is that of "pruning". Generally speaking, pruning involves reducing the number of cases which a program considers, by eliminating from further consideration those cases which, for one reason or another, do not appear to warrant further computation. For example, in the system described in the above mentioned application Ser. No. 797,249, the dynamic programming algorithm produces a score for each word in its active vocabulary after each frame of an utterance. This score corresponds to the likelihood that the frames received so far match the given word. After the score for each word in the active vocabulary is updated, it is compared with the best score produced for any word. If the difference between the score for a given word and the best score exceeds a certain threshold, that given word is removed, or pruned, from the active vocabulary and future frames are no longer compared against it. This technique greatly improves the computational efficiency, since it enables poorly scoring words to be removed from consideration long before all of the frames of an utterance have been processed.

The system described in the above mentioned application Ser. No. 797,249 further reduces computational demands and the likelihood of confusion by using a language model. Such a language model predicts the relative likelihood of the occurrence of each word in the system's vocabulary, given the word spoken before it. Such language models make use of the fact that in human language the likelihood that a given word will be spoken is greatly influenced by the context of the one or more words which precede it. Language model probabilities are calculated by analyzing a large body of text and determining from it the number of times that each word in the vocabulary is preceded by each other word in the vocabulary.

The system described in the above mentioned application Ser. No. 797,249 further reduces computation by prefiltering its vocabulary words. This prefiltering runs a superficial recognition against a vocabulary to quickly select those of its words which appear similar enough to the utterance to be recognized to warrant a more detailed comparison with that utterance.

Although these and other previously developed methods greatly reduce the computation required for speech recognition, there still is a need to further reduce such computation if present day personal computers are to be capable of recognizing large vocabularies, such as vocabularies of twenty-thousand words or more, without the addition of expensive computational hardware.

Another problem encountered with prior art speech recognition systems, particularly those attempting to deal with relatively large vocabularies, is that recognition performance is far from foolproof. For this reason, it is desirable to create methods by which an operator can indicate to the system whether or not its attempted recognition is correct, and if not, by which he can correct the mistake as easily as possible. The above mentioned U.S. patent application Ser. No. 797,249 discloses means for displaying a list of a recognition's best scoring word candidates, in order of their score, and means for enabling the operator to select any of the displayed words by typing a number associated with it, or to select the best scoring word by speaking another word to be recognized. Although this system works well in the real time dictation of discrete words, it does not address the issue of correcting errors in previously dictated speech or in continous speech. Also when this system is used with large vocabularies, the amount of time required before the system displays any words for the operator to chose increases with the size of the recognition vocabulary, and in large vocabulary systems can be annoyingly slow.

SUMMARY OF THE INVENTION

It is an object of the present invention to provide speech recognition apparatuses capable of dealing with relatively large vocabularies in a computationally efficient manner.

It is a further object of the present invention to provide speech recognition apparatuses capable of reducing the number of words which undergo an extensive acoustic match against the utterance to be recognized.

It is yet another object of the present invention to provide speech recognition apparatuses capable of using language model information in a new manner to reduce computation.

It is still another object of the present invention to provide speech recognition apparatuses capable of recognizing continous speech with reduced computation.

It is a further object of the present invention to provide apparatuses for speech recognition which can recognize a succession of pre-recorded words with improved computational efficiency.

It is still a further object of the present invention to provide apparatuses capable of recognizing words from a large vocabulary and yet also capable of recognizing most words quickly.

According to one aspect of the present invention, a speech recognition system is provided which comprises means for receiving an acoustic description of a portion of speech to be recognized and means for storing an acoustic description of each word in a system vocabulary. The system further includes recognition means for making a determination of which one or more words of a given recognition vocabulary most probably correspond to a portion of speech to be recognized, selection means for enabling an operator to select an initial string of one or more letters, and alphabetical filtering means for selecting a sub-vocabulary from the system vocabulary and supplying it to the recognition means as the recognition vocabulary. This alphabetic filtering means includes means responsive to the selection means for causing the sub-vocabulary to include an increased percent of vocabulary words which start with the initial string selected by the selection means.

In a preferred embodiment of the invention, the alphabetic filtering means causes a substantial majority of the words in the sub-vocabulary it selects to start with the selected initial string. The selection of an initial string can be performed either before an utterance to be detected is spoken, during its recognition, or after the utterance has undergone an initial recognition and the words considered most likely to correspond to the utterance have been displayed for a user to choose among. Preferably, if an initial string is not chosen before the speaking of an utterance, the system runs recognition against a vocabulary which is not specific to any initial string. It is also preferred that the system include means which enable additional letters to be added to the initial string after it is first selected, causing the alphabetic filtering means to select an even more narrow sub-vocabulary of words. The selection of initial strings can be performed by various means, such as by keyboards or by voice recognition means, and the use of alphabetic filtering to limit vocabulary can be applied to the recognition of a pre-recorded sequence of words and continuous speech.

According to another aspect of the present invention, a speech recognition system is provided which includes means for recording an extended acoustic description of a plurality of successive spoken words. The system further includes means for storing an acoustic description of each word in a recognition vocabulary, and recognition means for making a determination of which words in the recognition vocabulary most probably correspond to a given portion of speech recorded in the extended acoustic description. The system also includes choice display means for displaying a plurality of the words determined by the recognition means to most probably correspond to the given portion of speech to be recognized, and word selections means for enabling an operator to select which of the plurality of displayed words is the intended word. The speech recognition system further includes means, responsive to the selection by said selection means of a displayed word as the intended word, for supplying a successive portion of the extended acoustic description to the recognition means as the next given portion of speech to be recognized.

In a preferred embodiment of this aspect of the invention, the speech recognition system further includes means for playing back an audio representation of a portion of speech to be recognized, so that it can be heard by a human operator. Preferably the system includes means which wait for the operator to select one of the displayed words before it proceeds to recognize a successive portion of speech, as well as means which select the displayed word considered most likely to correspond to the previously recognized portion of speech when the operator fails to select a displayed word within a given response time. Preferably, the system can be used for continuous speech and includes means for determining where in the extended acoustic description the description of each displayed words ends, and means, responsive to the selection of a given displayed word, for causing the end of that word in the acoustic description to be used in picking the starting position of the next portion of speech to be recognized.

According to another aspect of the present invention, a speech recognition system is provided which includes a language model filtering means for selecting a subvocabulary of words to be recognized from a larger vocabulary as a function of the language context of the word to be recognized.

According to yet another embodiment of the present invention, the speech recognition system includes means for causing the recognition means to first make a determination of which one or more words of a first recognition vocabulary most probably correspond to a portion of speech to be recognized and then for causing a recognition means to make a determination of which one or more words of a second recognition vocabulary most probably correspond to that portion of speech. Preferably, the second vocabulary is substantially larger than the first vocabulary and the system includes means for displaying words recognized from the first subvocabulary as soon as the recognition from that subvocabulary takes place so as to give an operator rapid feedback on the recognition process.

DESCRIPTION OF THE DRAWINGS

These and other aspects of the present invention will become more clear upon reading the following description of the preferred embodiment in conjunction with the accompanying drawings, in which:

FIG. 1 is a schematic block diagram of the hardware used in a preferred embodiment of the present invention;

FIG. 2 is a schematic diagram representing the dynamic programming technique used in a preferred embodiment of the present invention;

FIG. 9 is a portion of C programming code which represents the "main()" function of the program used in the first preferred embodiment to the present invention;

FIGS. 10–16 contain the C programming code of subroutines called by or used in conjunction with the "main()" function shown in FIG. 9;

FIG. 17 is a portion of C programming code which represents the "main()" function of the program used in the second preferred embodiment of the present invention;

FIGS. 18–25 contain C code of subroutines called by or used in conjunction with the "main()" function shown in FIG. 17;

DETAILED DESCRIPTION OF PREFERRED EMBODIMENTS

Figure 3:
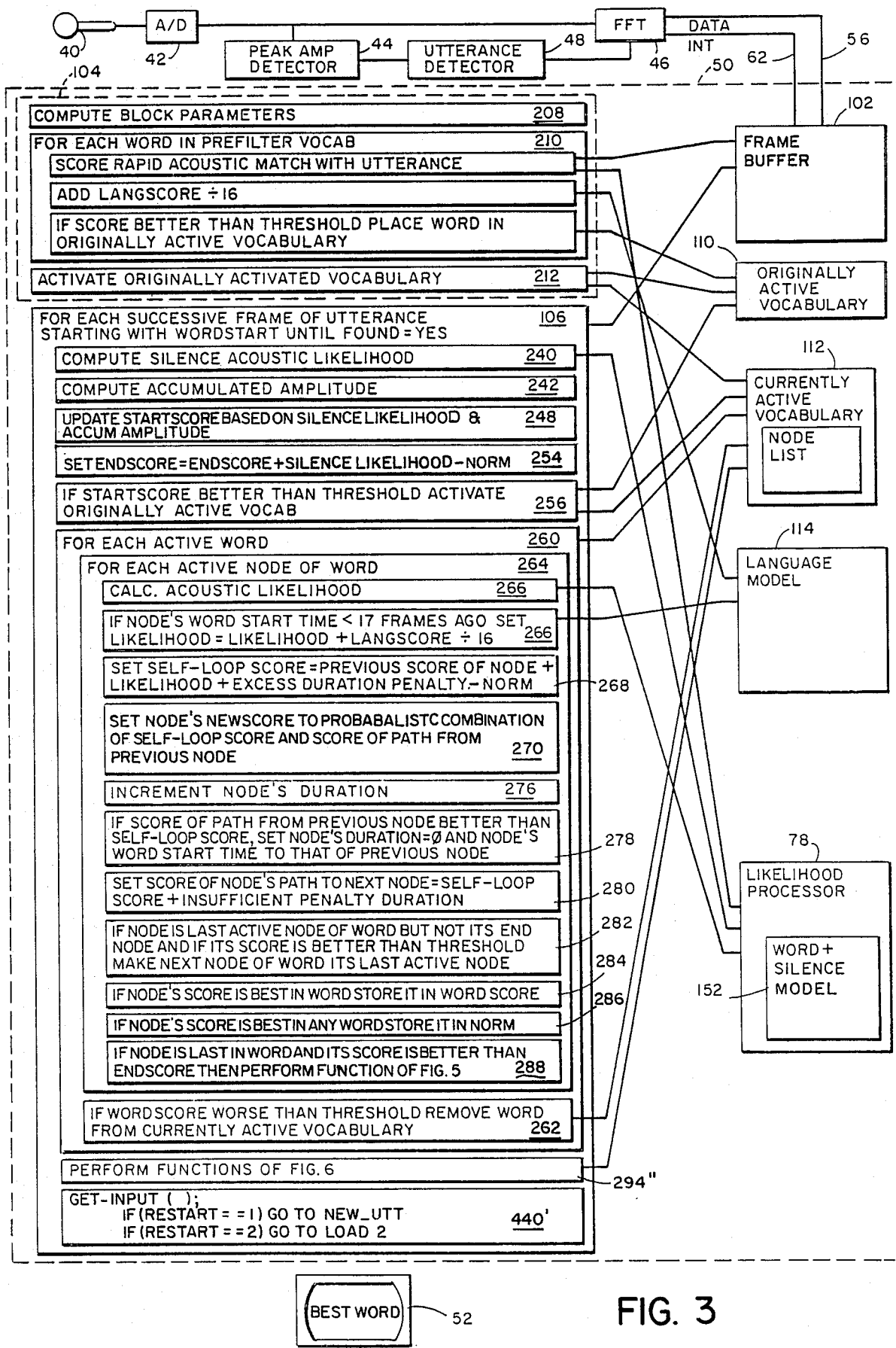
FIG. 3 is a schematic block diagram illustrating the computational structure used to perform speech recognition in a first preferred embodiment of the present invention.

Referring now to FIG. 1, a block diagram of the hardware used in preferred embodiments of the present invention is shown. The hardware shown in FIG. 1 is identical to that shown in FIG. 1 of the above-mentioned U.S. patent application Ser. No. 797,249, which is incorporated herein by reference, with the addition of the following circuitry; an audio compression/decompression circuit 422, a D-A circuit 424, an audio speaker 426, a hard disc drive 428, and a hard disc controller 430. Much of the circuitry shown in FIG. 1 is standard in many personal computer and computer workstations. For example, it is common for IBM PC AT'S, when equipped with hard discs, to include the system bus 60, the CPU 64, the memory 68, the input port 58, the video interface 80 and video monitor 52, the keyboard interface 82 and keyboard 54, and the disc controller 430 and hard disc 428, all shown in FIG. 1. Thus, such items are all well-known in the computing arts.

Figure 4:
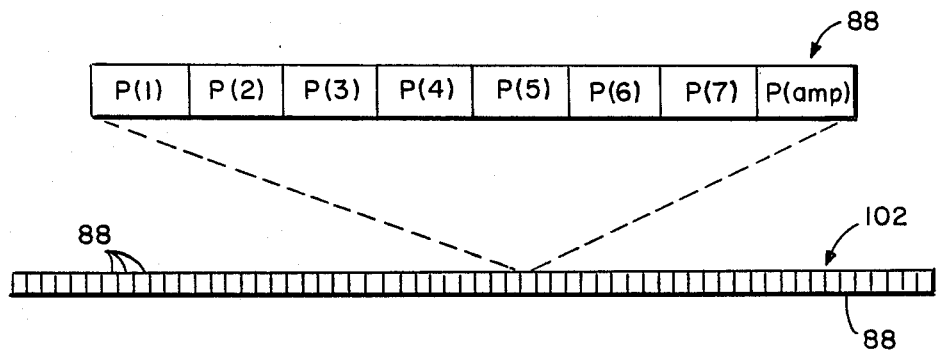
FIG. 4 is a schematic representation of the frame buffer shown in FIG. 3.

Added to these standard components is a microphone 40 for the recording of speech. As is described in greater detail in the above-mentioned application Ser. No. 797,249, the speech signal produced at the microphone 40 in response to the speaking of words by a human is converted to digital data by an A-D converter 42. A fast fourier transform circuit 46 is used to convert this digital information into a sequence of frames, each of which contains spectral information describing the energies of the speech signal at various frequencies. A sequence of frames 88 produced by the output of the FFT circuit 46 is shown in FIG. 2 by the numeral 432. The sequence of frames produced by the FFT circuit 46 is supplied through the input port 58 to the CPU 64, which writes those frames into a buffer 102 contained in the memory 68. FIG. 4 shows a sequence of frames 88 written into the buffer 102, with each frames comprising 8 spectrally derived parameters P(1) through P(AMP), as is described in greater detail in the above-mentioned application Ser. No. 797,249.

The circuitry of FIG. 1 also includes a peak amplitude detector 44 and an utterance detector 48, the operation of which are described in greater detail in application Ser. No. 797,249. This circuitry indicates when a new utterance has begun. Utterance detectors of various sorts are well known in the art of speech detection, and any utterance detection device which properly informs the system when speech has begun can be used with the present invention.

The audio compression circuit 422 is connected to the output of A-D converter 42. Its function is to digitally compress the speech signal produced at the output of the A-D converter 42 so it can be stored more efficiently than if the output of the A-D converter 42 were stored directly. The circuit 422 also includes means for decompressing such compressed signals, so they can be played back through D-A converter 424, enabling a human to hear and understand them. Audio compression and decompression devices are well known in the arts of speech processing, and thus need not be explained in greater detail.

The preferred embodiments of the present invention use a speech recognition algorithm which is substantially similar to that described in the above-mentioned application Ser. No. 797,249. This algorithm is represented in a very abstract manner in FIG. 2, which shows the sequence 432 of frames to be recognized being time aligned and compared against the successive nodes 436 of a word model 434. The dynamic programming algorithm time aligns the successive probabilistic frame-like models, or nodes, 436 of each word in a recognition vocabulary against the successive frames 88 of the speech to be recognized. This dynamic programming algorithm finds the optimal time alignment of the nodes in each word model against the frames of the speech to be recognized, and provides a score indicating the mathematical likelihood that each such word corresponds to that speech. The system then displays one or more of the best scoring words on the video monitor 52 for an operator to see.

Referring now to FIGS. 9 through 16, and FIGS. 3 through 6, a description of a first preferred embodiment of the present invention will be made. This first preferred embodiment is designed to recognize discrete utterances, that is individual words separated by pauses. This system is designed to be used in a manner in which an operator speaks a word, sees the system's response to that word, and then speaks an additional word, if desired.

The programming in FIGS. 9 through 25 is written in the well-known "C" programming language. For purposes of simplicity, obvious definitions of constants, declaration of variables, and description of sub-routines well within the skill of professional C programmers are omitted.

FIG. 9 is the central function, "main()", of the program of the first preferred embodiment of the present invention. This function "main()" is divided into three parts. The first starts on line 4 and has the label "BEGIN". This part, which is only used when the program is first entered, initializes the variables listed on lines 5 through 9 of FIG. 9. The second part of "main()" starts at the label "NEW_UTT" on line 10 and extends through line 24. The program starts to execute NEW_UTT every time it is ready to begin the recognition of a new word. NEW_UTT runs recognition of an utterance against a one thousand word vocabulary selected by a language model and displays the words it considers most likely to match that utterance. The third basic part of "main()" starts with the label "LOAD2" on line 25 and extends through line 52. LOAD2 is reached if the recognition of NEW_UTT is completed or if the recognition of NEW_UTT is aborted by a user's command to run recognition against an alphabetically filtered vocabulary. In either case, LOAD2 runs recognition against a vocabulary different than that used in NEW_UTT. If no initial string has been selected, LOAD2 runs recognition against the complete system vocabulary, otherwise, it runs recognition against a sub-vocabulary comprised of words starting with the selected initial string.

As is stated above, when "main()" is first entered, BEGIN initializes a group of variables. Line 6 sets the flag "second_display_flag" to NO. This flag indicates whether the word selected by the recognition of LOAD2 should be displayed. Next, Line 7 sets the variable "wordstart" to NULL. "Wordstart" points to the position in the frame buffer 102 of FIG. 4 at which the current utterance to be recognized starts. When "wordstart" is NULL, it indicates that the system does not presently have an utterance upon which to perform recognition.

Line 8 sets the variable "nextwordstart" to NULL. "Nextwordstart" points to the beginning of the most recent utterance recorded in the frame buffer 102. The function "record_utterence()" shown in FIG. 14 is part of an interrupt service routine which is called when the utterance detection circuitry 48 generates an interrupt signal, rather than being called as a normal subroutine. Techniques for programming interrupt service routines are well known to those skilled in the art of computer programming. Every time the utterance detection circuitry 48 detects the beginning of a word, the function "record_utterance()" shown in FIG. 14 sets "nextwordstart" equal to the current value of "writeptr" if either the variable "found" is equal to "YES" or a function "choices_displayed()" indicates that word choices from a previous recognition are still on the screen. Since "writeptr" is the position at which frames from the FFT circuit 46 are written into the buffer 102, this causes "nextwordstart" to point to the position in frame buffer 102 at which the sequence of frames associated with detected utterance are written.

As is described in application Ser. No. 797,249, utterances are usually not detected until the amplitude of a speech sound has reached a reasonably high level. Since it is common for some words to start with relatively low amplitude sounds, it is best to provide a recognition program with frames starting some time, such as sixteen frames, before the speech sounds reach the amplitude necessary to trigger the utterance detector. For this reason it is preferred that the output of the FFT 46 be fed into a sixteen frame circular buffer, which always contains the last sixteen frames produced by the FFT circuit. Then when an utterance is detected, the sixteen frames prior to its detection, as well as all the other frames of the utterance until one half second of silence is detected, are recorded starting at "writeptr" in the larger frame buffer 102. This enables the speech recognition program to have access to the entire utterance, starting 16 frames before utterance detection, and it prevents the buffer 102 from being filled with a large number of silence frames if there are long pauses between words. Methods of implementing a large circular frame buffer 102, a sixteen frame circular buffer, and means for writing from the sixteen frame buffer to the buffer 102 are well within the skill of professional programmers.

After line 8 of FIG. 9 sets "nextwordstart" to NULL, Line 9 sets the variable "word" to NULL. "Word" stores the word ID of the last word recognized by the system. It is set to NULL upon entering the program, since, at that point, there is no previously recognized word.

On line 10, the portion of the program labeled NEW_UTT begins. On line 11 NEW_UTT clears, or empties, the string variable "initial_string". As is explained below, the vocabulary against which the recognition in LOAD2 is run is limited to words which start with the characters contained in the initial string stored in this variable. When the initial string is empty, LOAD2 does not limit the system vocabulary at all, and runs recognition against the entire system vocabulary.

Line 12 calls the function "get_language_model_vocabulary()" with "word" as a parameter. As is shown in line 5 of FIG. 12, this function sets the value of the prefilter vocabulary pointer "prefilter_vocab_ptr" to the value of the element of a language model array "lang_model" indexed by "word". The prefilter vocabulary pointer is used to point to the list of words to be prefiltered by the function "prefilter()" on line 17 of FIG. 9. As is stated above, "word" represents the last word recognized by the system. The language model array has one entry for each possible previous word in the system vocabulary. That entry is a pointer to the list of one thousand words determined by a statistical language model to be most likely to follow the given previous word recognized by the system. As is well known, a statistical language model of which words are likely to follow which other words can be determined by analyzing large volumes of text and determining the probability with which each given word is followed by each other word in that text. "Lang_model[0]" points to the list of one thousand words determined by the language model to be most common in the absence of any known prior words. This makes sense, because "word" is set to NULL, or zero, when there is no known previously recognized word.

When line 12's call to "get_language_model_vocabulary()" returns, lines 13-16 of FIG. 9 repeat a "while" loop until either (1) "wordstart" is given a value other than NULL, indicating that the program has a current utterance upon which to perform recognition, or (2) the operator types a key indicating that the next recognition should be performed against an alphabetically filtered vocabulary by jumping to LOAD2. Until either of these conditions is met, line 14 repeatedly calls the function "get_input()" which checks for the start of the next utterance or the typing of a key by the operator.

"Get_input()" is shown in FIG. 10. Line 3.5 of this function sets the variable "restart" to NULL, that is, to zero. "Restart" is used to indicate to "main()", on "get_input()'s" return to it, that "main()" should jump to NEW_UTT and start recognition on a new word if "restart" is one, should jump to LOAD2 and start a recognition on the current word using a new vocabulary if "restart" is two, or should continue executing instructions without jumping if "restart" is NULL. "Restart" is set to NULL at the start of each call to "get_input()" to insure that the function returns with the variable equal to NULL unless it specifically sets "restart" to one or two.

Line 4 of "get_input()" tests if "wordstart" and "nextwordstart" are not equal. As is stated above, each time the utterance detection circuitry 48 generates an interrupt signal, the function "record_utterance()" shown in FIG. 14 sets "nextwordstart" equal to the value of "writeptr" at which frames associated with the detected utterance are written into the frame buffer 102. If line 4 of "get_input()" finds that "wordstart" and "nextwordstart" are not equal, it indicates there has been an new utterance since "wordstart" was last set, and it causes lines 5-13 of FIG. 10 to be executed. Line 5 points "wordstart" to the new utterance pointed to by "nextwordstart". Line 6 calls a function "choices_displayed()", which indicates if the system is currently displaying the word choices from a previous recognition. If word choices are being displayed when a new utterance is detected, the system considers the utterance a confirmation of the best scoring word choice, and line 7 of "get_input()" sets the variable "key" to the ascii value '1', indicating that the number one word choice has been confirmed. Then line 8 sets the variable "voice_confirm" to YES, indicating that a word choice was confirmed by voice, rather than by the pressing of a key.

If, on the other hand, line 6 of FIG. 10 indicates word choices were not displayed at the time of the new utterance, line 11 sets "key" to UNDEF, a value indicating that the operator has not typed a key and has not confirmed a word choice by voice. Then line 12 sets "voice_confirm" to NO, indicating that the new utterance was not a voice confirmation of a previously recognized word.

If line 4 finds "wordstart" and "nextwordstart" equal, indicating there is no new word to recognize, the program skips lines 5-13 and advances to line 14, where it calls "kbhit()" to see if a key has been pressed. If so, line 15 sets "key" equal to the character of the key pressed, and line 16 sets "voice_confirm" to NO, indicating there has been no voice confirmation of a word choice. If the tests on line 4 and 14 both fail, indicating that the operator has made no response, line 18 sets "key" equal to UNDEF.

If "key" is other than UNDEF, indicating that the operator has made a response, line 19 of "get_input()" calls the function "handle_response()" shown in FIG. 11. Its role is to respond to the value of "key" selected by the operator. "Handle_response()" starts on line 5 of FIG. 11 by setting the variable "keynumber" to the integer value, if any, represented by the ASCII value of "key". For example, if key is the character '1', "keynumber" is set to the integer one.

Line 6 of "handle_response()" tests to see if any word choices are being displayed and, if so, whether "keynumber" corresponds to the number of a word choices. As is described in greater detail below, when recognition is run, the best scoring words are placed in an array called "choice", in order of their score, with the best scoring word placed in "choice[1]", and with a count of the number of words placed in the "choice" array placed in "choice[0]". When word choices are displayed, each is displayed with its associated "choice" number, or index, next to it. If a recognition produces no word choices above a certain threshold, "choice[0]" is set to zero. If word choices are displayed and "keynumber" is equal to the index of a displayed word choice, lines 7-13 are executed. Line 7 calls the function "erase_choices_if_any()", which removes the display of word choices from the screen, if there is any, and clears the "choice" array by setting "choice[0]" to zero. Line 7.5 sets "word" equal to the displayed word choice selected by "keynumber", that is, equal to the word "choice[keynumber]".

Line 8 of FIG. 11 calls a function "pass_to_application()", which supplies a series of ASCII characters associated with "word", usually its spelling, as an output. The speech recognition programs of the preferred embodiments of the invention shown in this application are designed to provide output for use by another program, such as a word processor, run in conjunction with them. It is well known in the computer arts that programs can be designed so the output of one is supplied as the input to another, and that the output from one program, can, for example, be supplied to the other as if it had been typed in at a keyboard. In alternate embodiments of the invention, however, the speech recognition functions of the present invention can be integrated into a larger program, and the output produced by those recognition functions would be supplied as inputs to the other parts of the such a larger program.

Line 9 of FIG. 11 sets "second_display_flag" to NO, so that the results of the next LOAD2 recognition will not be displayed unless the operator requests them. Line 10 sets "wordstart" to NULL, indicating that the current utterance has been recognized and should no longer be considered the current utterance for recognition purposes. Line 11 sets "nextwordstart" to NULL if "voice_confirm" is NO. If "voice_confirm" is NO here, the operator has just selected a word choice by pressing a key, and "nextwordstart" is reset so the next recognition starts with the first word uttered after the pressing of that key. If, on the other hand, "voice_confirm" is YES, the operator has confirmed a word choice by uttering another word to be recognized. In this case, "nextwordstart" is not reset so its pointer to the confirming utterance to be recognized is not lost. Line 12 of FIG. 11 sets "restart" to one, indicating that the recognition of the current word is complete and that the entire program should advance to the recognition of another word. Then line 13 causes the program to return from "handle_response()".

If "handle_response()" is called with "key" equal to "*", indicating that the operator wants the system to run recognition against the full system vocabulary, line 15 of FIG. 11 causes lines 16 through 20 to be executed. Line 16 erases any current display of word choices. Line 17 displays a prompt on the screen containing the words "RUNNING RECOGNITION ON FULL VOCABULARY". Line 18 sets the "second_display_flag" to YES. This allows the word choices selected by LOAD2's recognition against the entire system vocabulary to be displayed. Then line 19 sets "restart" to zero, indicating that neither a jump to NEW_UTT nor a jump to LOAD2 should be performed upon return to "main()". Finally line 20 returns the program from "handle_response()".

If "handle_response()" is called with "key" equal to the DELETE character, the test on line 22 of that function, causes its lines 23 through 27 to be executed. Line 23 erases the display of any word choices. Line 24 sets the "second_display_flag" to NO, indicating that word choices from the next recognition of LOAD2 are not to be displayed. Line 25 sets both "wordstart" and "nextwordstart" to NULL, indicating that no further recognition is to be done upon any utterances currently contained in the frame buffer 102. Line 26 sets "restart" to one, indicating that the program is to jump to NEW_UTT (unless it already there) and start recognition of a new word. Finally line 27 causes "handle_response()" to return.

If "handle_response()" is entered with "key" equal to an upper or lower case letter, line 29 of that function causes its lines 30 through 39 to be executed. Line 31 erases any displayed word choices. Line 35 calls a function which adds the character contained in "key" to the end of the initial string. Line 36 sets the "second_display_flag" to YES, indicating that the word choices produced by LOAD2 are to be displayed. Line 37 sets "restart" to two, indicating that the program should jump to LOAD2 and perform recognition on the current utterance against a sub-vocabulary of words starting with the initial string. Line 38 cause "handle_response()" to return.

If "handle_response()" is entered with "key" equal to the space character, line 51 of that function causes its lines 52 through 61 to be executed. "Handle_response()" interprets typing of a space key as an indication that the operator wants the initial string to be produced as an output from the recognition program, as if it were recognized word, so it can be used as an input by the application program being used with the recognition program. This enables an operator to spell any word or sequence of characters. Line 52 of FIG. 11 erases any display of word choices. Line 53 sets "word", which stores the word ID of the last word recognized by the system, to the word ID of the initial string, if it is a word in the system vocabulary, and sets "word" to NULL if the initial string is not in the system vocabulary. Line 56 then calls the function. "pass__initial_string_to_application()" which produces the initial string plus a following space as an output from the recognition program to the application program being used in conjunction with it. Line 58 sets the "second_display_flag" to NO. Line 59 sets "wordstart" and "nextwordstart" to NULL, indicating that the system is to wait for the beginning of another utterance before recognition begins. Line 60 sets "restart" to one, indicating that the system should jump to NEW_UTT to start recognition on the next utterance. Then line 61 causes "handle_response()" to return.

Once "handle_response()" returns to line 20 of FIG. 10, "get_input()" returns to "main()" in FIG. 9.

Returning now to FIG. 9, after "get_input" has been called on line 14, the program advances to line 15, which jumps to LOAD2 if "restart" has been set to 2, indicating that the operator has requested that recognition be performed against an alphabetically filtered vocabulary. If such a jump is not taken, the "while" loop of lines 13-16 of FIG. 9, repeatedly calls "get_input()" until that function points "wordstart" to a new utterance or sets "restart" to two, causing line 15 to jump to LOAD2. If the operator does start a new utterance, "get_input()" points "wordstart" to its beginning, causing the program to exit the "while" loop and advance to line 17. Line 17 calls the function "prefilter()", passing it "wordstart" as a parameter.

Referring now to FIG. 3, the function "prefilter()" corresponds to the functional block 104 shown in that figure. This block 104 is identical to the block 104 shown in FIG. 8 of the above mentioned U.S. patent application Ser. No. 797,249, except that the prefiltering shown in the present application is performed on a prefilter vocabulary pointed to by the prefilter vocabulary pointer discussed above with regard to FIG. 12. As is described in greater detail in application Ser. No. 797,249, the prefiltering function contained in block 104 forms a crude acoustic matching between the beginning of the utterance to be detected and the beginning of each word in the vocabulary to be prefiltered. It places those words from the prefilter vocabulary which score best on this crude acoustic match into a currently active vocabulary 212, upon which a more lengthy acoustic match is performed by the functional block 106 shown in FIG. 3. The function "prefilter()" starts its acoustic match thirteen frames after the frame pointed to by "wordstart". This is three frames before the utterance detection associated with "wordstart", as is discussed in application Ser. No. 797,249.

After the prefiltering of block 104 has been performed, the function "main()" of FIG. 9 advances to line 17.5, which sets a variable "found" to NO. This variable terminates the loop starting on the next line of FIG. 9 once it attains the value YES. "Found" is set to NO in line 17.5 to insure that the loop starting on line 18 is executed.

Once "found" has been set the program advances to lines 18 through 23 of that figure, which corresponds to the functional block 106 of FIG. 3. The function "score_frame()" on line 19 of FIG. 9, corresponds to all of the functions contained within block 106 of FIG. 3, with the exception of the function 440', which corresponds to lines 20–22, or to lines 35–37, of FIG. 9.

Figure 8:
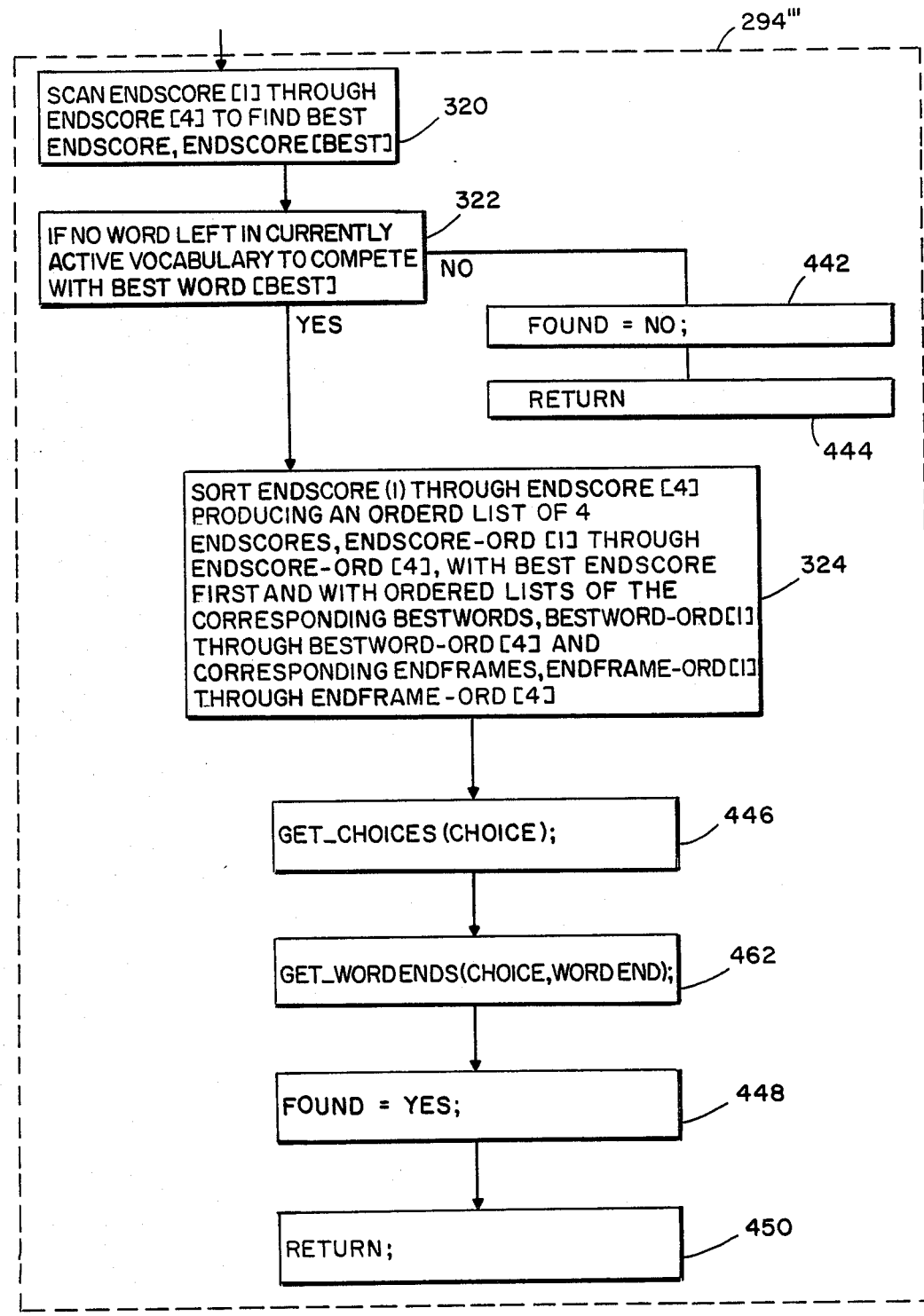
FIG. 8 is a more detailed schematic description of the computational steps contained within step 294''' shown in FIG. 7.

Block 106 of FIG. 3 is very similar to the block 106 of FIG. 8 of the above mentioned U.S. patent application Ser. No. 797,249. As is described in much greater detail in that previous application, the block 106 performs dynamic programming of each successive frame, in the frame buffer 102, starting with an initial frame, against each active node of each active word in the currently active vocabulary. As explained in application Ser. No. 797,249, this process prunes words from the currently active vocabulary if their scores fall below a certain threshold and it continues operating for each successive frame until no word is left in the currently active vocabulary to compete with the best scoring word.

The only differences between block 106 of FIG. 3 and block 106 of the previous application Ser. No. 797,249 are as follows:

(1) Block 106 of the present application starts recognition with the frame pointed to by "wordstart" rather than the frame "utterance detection minus 16" as in the prior application. This is a difference in name only, since, "wordstart" points to the first frame recorded in conjunction with an utterance, which is the frame generated 16 frame periods before the detection of that utterance.

Figure 5:
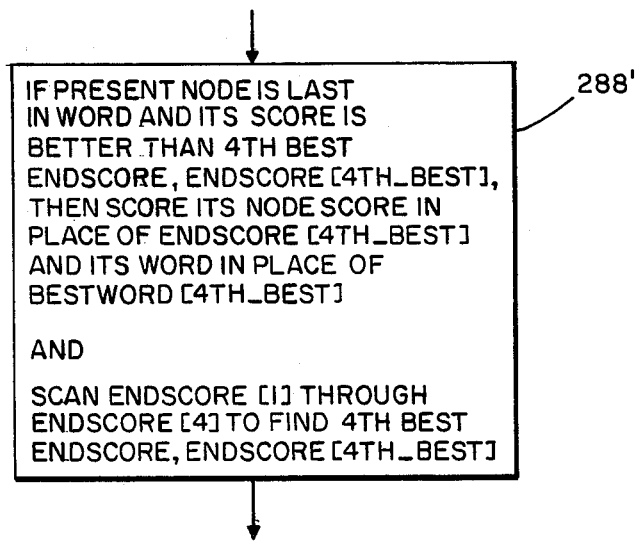
FIG. 5 is a more detailed block diagram of the computation of step 228' shown in FIG. 3.

(2) Block 106 of the present application replaces block 228 of the prior Application with a block 228', shown in FIG. 5 of the present Application. Block 228' of the present application is identical to block 228' shown in FIG. 24 of the prior application. As is explained in the previous application, block 288' checks if the node being compared against the current frame is the last node in a word model, and if so, it checks if its score is better than the worst of the four best scoring final node scores, or "endscores", recognized so far. If it is, the score of the current endnode is stored in place of fourth best "endscore" and its word ID is stored in the variable "bestword" associated with that fourth best "endscore". Once this is done, the program finds what is currently the worst of the four best "endscores" for use in the next call to block 288'.

Figure 6:
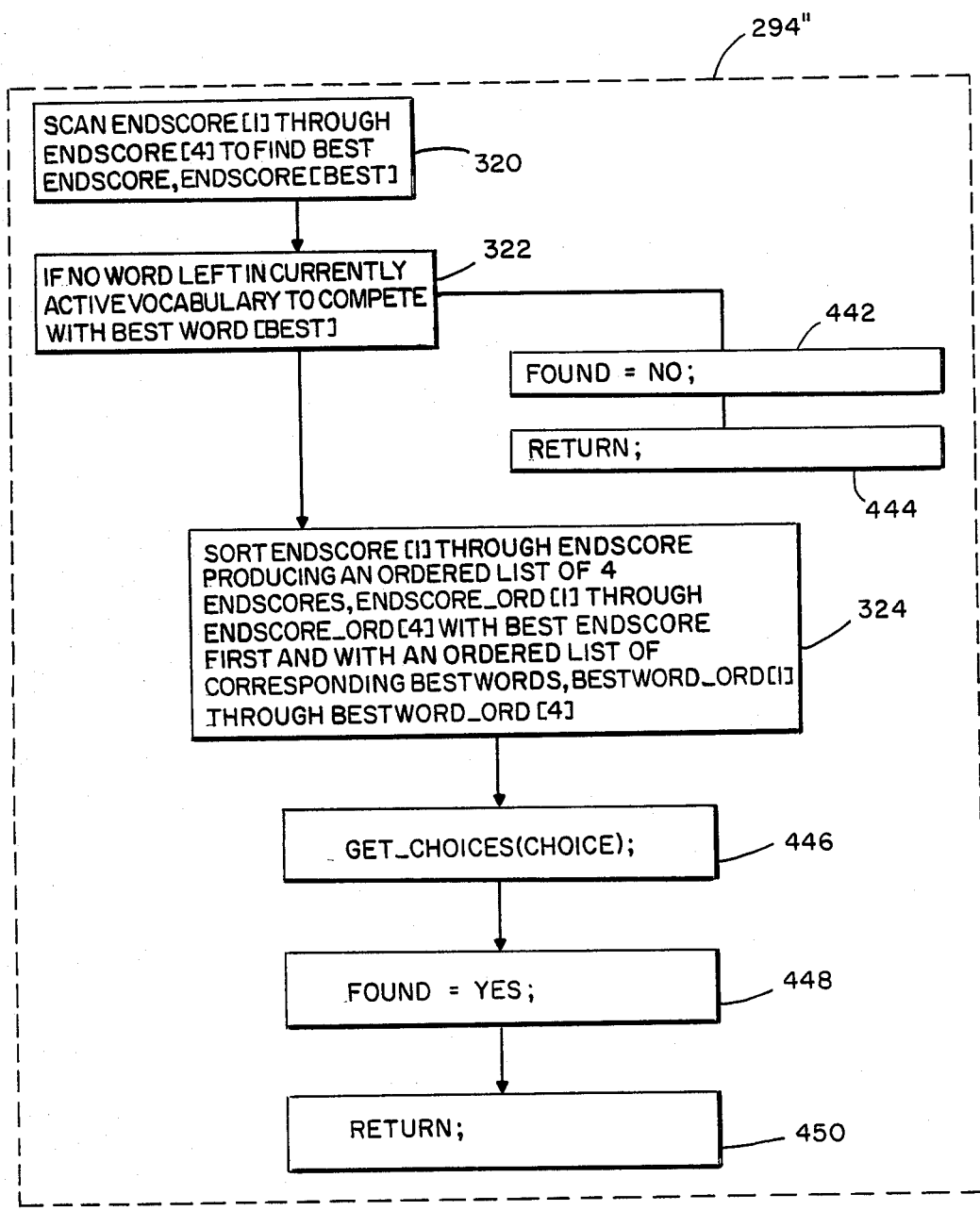
FIG. 6 is a schematic block diagram illustrating the computational structure of block 294" shown in FIG. 3.

(3) Block 106 of the present application replaces block 249 of the previous application with a block 249", which is shown in greater detail in FIG. 6 of the present application. Block 249" is performed for each frame, after the comparison of that frame against each active node of each active word is complete. Steps 320, 322, and 324 of block 294" are identical to the correspondingly numbered steps in the previous application. Step 320 finds the best of the four best "endscores". Step 322, sees if there is any word left in the currently active vocabulary other than the word having that best scoring "endscore". If there are such other words left in the currently active vocabulary, indicating that recognition is not complete, step 442 sets "found" to NO and step 444 returns from the block 294", causing block 106 to perform dynamic programming on the next frame in the buffer 102. If, on the other hand, step 322 finds no word left to compete with the best scoring word, indicating that recognition is complete, block 294" advances to step 324. Step 324 sorts the four best scoring "endscores", "endscore[1]" through "endscore[4]" to produce a list of four ordered "endscores", "endscore_ord[1]" through "endscore_ord[4]" with the best scoring "endscore" first. Step 324 also produces a corresponding list of ordered "bestwords", "bestword_ord[1]" through "bestword_ord[4]". Once this is done block 294" advances to step 446, which calls a function "getchoices()" shown in FIG. 15. "Get_choices()" copies any of the four best scoring words with scores better than threshold into the "choices" array, with the best scoring word stored at "choice[1]". "Get_choices()" also sets "choices[0]" equal to the number of such words copied. Then block 294" advances to step 448, which sets "found" to YES and to step 450 which returns.

(4) Finally, block 106 of the present application includes a step 440' which is not included in block 106 of the previous application. As is shown in FIG. 3 of the present application, block 106 advances to step 440' once step 294" has been completed. Step 440' corresponds to the instructions on lines 20–22, and on lines 35–37, of FIG. 9. Like block 294", block 440' is only reached after all the scoring for a given frame has been completed. Block 440' calls "get_input()" to determine if the user has started a new utterance or typed a key. Then it aborts the present recognition, jumping to NEW_UTT if "get_input()" has set "restart" to one, and jumping to LOAD2 if "get_input()" has set "restart" to two.

When the recognition of block 106 of FIG. 3, which corresponds to lines 18–23 of FIG. 9, is complete, the program advances to line 24 of FIG. 9. Line 24 calls a function "display_choices()" which displays each of the word choices in the "choice" array on monitor 52 with the number of that word in the "choice" array next to it.

Once this is done, the program advances to LOAD2, which on line 26 calls the function "get_alphabetically_filtered_vocabulary()". As is shown in FIG. 13, "get_alphabetically_filtered_vocabulary()" makes a test on line 5 of FIG. 13 to see if the initial string is empty. If so, line 6 sets the prefilter vocabulary pointer equal to "whole_vocab_ptr", which points to a list of all words in the system vocabulary. If, on the other hand, the initial string is not empty, lines 8 and 9 of FIG.

13 set a variable "sub_vocab_start" equal to the first word in the system vocabulary which starts with the initial string. It does this by calling a string matching function "first_word_matching()", which searches an alphabetically ordered spelling of all words in the system vocabulary until it finds a word starting with the initial string. If no such word is found, the function beeps and informs the user of that fact. Lines 10 and 11 of FIG. 13 set a variable "sub_vocab_end" equal to the first word in the alphabetically ordered system vocabulary after "sub_vocab_start" which does not start with the initial string. This is done by calling another text matching function "first_word_not_matching()". Lines 12, 13, and 14 call a function "make_prefilter_vocab()". This function creates a list of all the alphabetically ordered system vocabulary words starting with "sub_vocab_start" and ending with the word before "sub_vocab_end". This is a list of all the words in the system vocabulary which start with the initial string. "Make_prefilter_vocab()" returns a pointer to the first word in this alphabetically filtered vocabulary and line 12 of FIG. 13 sets the prefilter vocabulary pointer equal to this pointer.

Once "get_alphabetically_filtered_vocabulary()" is complete, the program returns to line 27 of FIG. 9. In lines 27 through 31, a "while" loop, similar to that contained in lines 13 through 16 of FIG. 9, is repeatedly performed as long as "wordstart" is NULL, indicating that the system does not yet have a current utterance to recognized. As long as this is the case, the loop repeatedly calls "get_input()", looking either for the start of a new utterance or a key stroke. "Wordstart" should only be NULL on line 27 if the program has jumped to LOAD2 from line 15 before the start of an utterance, indicating that the recognition of the next utterance is to be performed against an alphabetically filtered vocabulary.

Once the "while" loop on lines 27-31 points "wordstart" to the utterance to be recognized, or if "wordstart" already points to such an utterance when line 27 is first reached, the program advances to line 32, which calls the "prefilter()" function 104, shown in FIG. 3 and described above. The operation of "prefilter()" on line 32 is identical to that on line 17, except that the prefilter vocabulary is different, being either the entire system vocabulary or an alphabetically filtered vocabulary, as is explained above with regard to the function "get_alphabetically_filtered_vocabulary()" on line 26 of FIG. 9.

After prefiltering has been performed, the program advances to line 32.5 which sets "found" to NO. This is done for the same reason that it was on line 17.5 above, that is, to ensure that the loop on the next line of FIG. 9 is executed. Once this is done the program advances to the "for" loop of lines 33-39 of FIG. 9. This loop is almost identical to that of lines 18-23, described above. The only difference is that the word choices produced by the recognition of lines 33 through 39 are placed in an array "L2choice" rather than the array "choice", so as to keep them distinct from the word choices, if any, found by the recognition of lines 18 through 23.

Once the recognition of lines 33 through 39 of FIG. 9 has been completed, line 40 of that figure tests if "second_display_flag" is YES. As is stated above, this flag indicates whether word choices from the LOAD2 recognition are to be displayed. If the flag is YES, lines 41-45 are executed. Line 41 erases any currently displayed choices. Lines 42 and 43 replace the word choices in the "choice" array with those in the "L2choice" array, and then line 44 displays those word choices on the screen. Finally, line 45 sets the "second_display_flag" to NO, preventing the result of the next LOAD2 recognition from being displayed unless the flag is subsequently set to YES.

Whether or not the test on line 40 is met, the program finally advances to the "for" loop on lines 47-51. This loop repeatedly calls "get_input()" until it either sets "restart" to one, which causes the program to return to NEW_UTT for the recognition of a new utterance, or sets "restart" to two, which causes the program to jump to LOAD2 for another recognition upon the current utterance.

Figure 26:
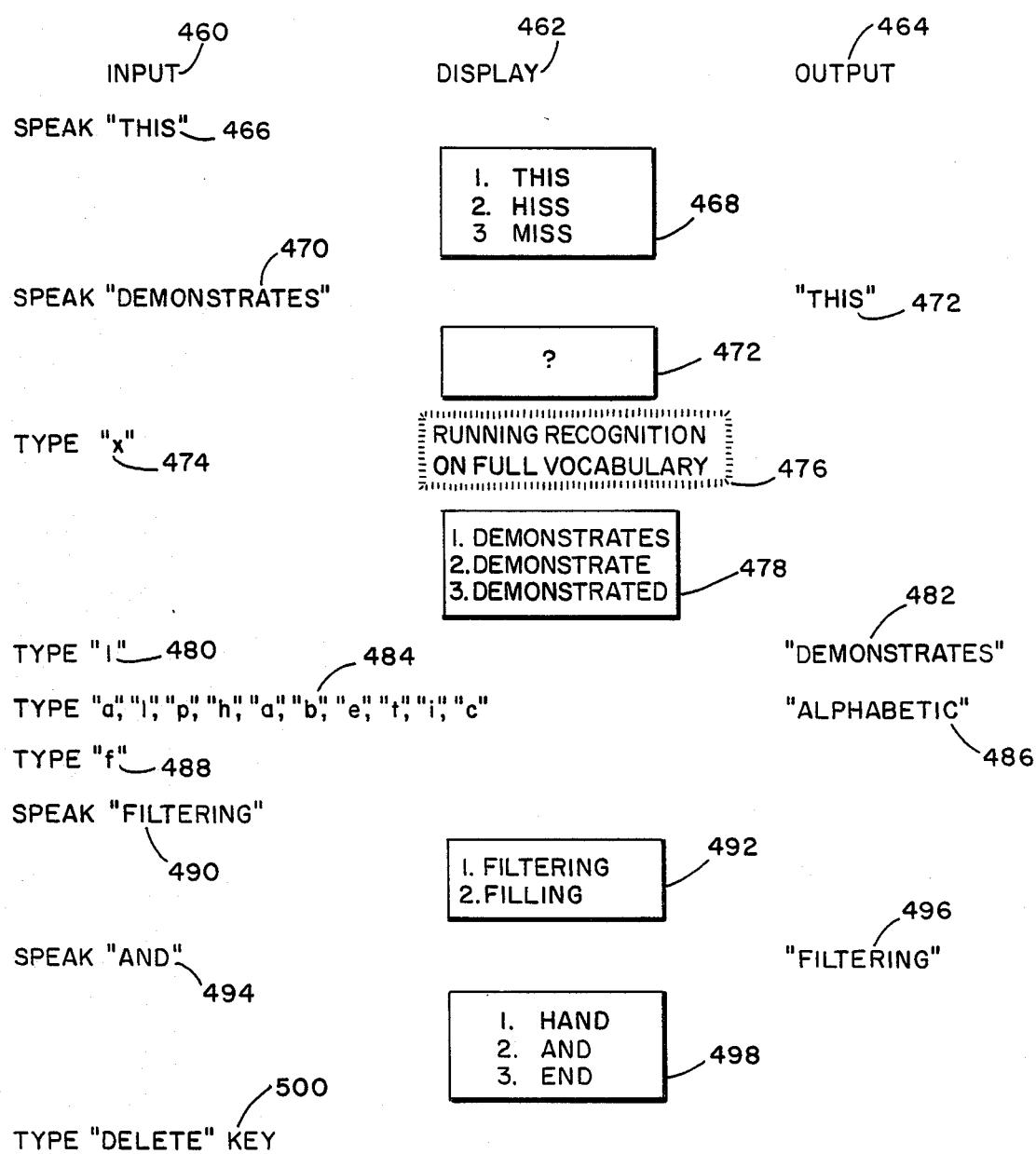
FIG. 26 represents sample input for use with the first preferred embodiment of the present invention, showing the displays and the output made by the system in response to such input.

Referring now to FIG. 26, the operation of the program of FIG. 9 is explained by showing how that program responds to a sample input. FIG. 26 is divided into three columns: an input column 460, indicating utterances or key strokes supplied by an operator as input; a middle display column 462, indicating the visual response which the program gives the operator in response to his inputs; and an output column, 464, displaying the words which the program produces as output for use by an application program run in conjunction with the recognition program.

When the program of FIG. 9 is first entered, the variables on lines 6-9 are initialized. The initial string is cleared on line 11. Line 12 sets the prefilter vocabulary to the one thousand word sub-vocabulary run when "word" is NULL, indicating there is no previously recognized word. And then, since "wordstart" is NULL, lines 13 through 16 repeatedly call "get_input()" for the first input from the operator.

When the operator speaks utterance 466, which is the word "this" shown in FIG. 26, the "record_utterance()" function of FIG. 14 points "nextwordstart" to the location in buffer 102 where that utterance is recorded. The next time "get_input()" is called by line 14 of FIG. 9, line 4 of "get_input()" finds "wordstart" and "nextwordstart" are not equal, and thus lines 5-13 of FIG. 10 are executed. Line 5 points "wordstart" to utterance 466 pointed to by "nextwordstart". Since there are no word choices displayed during utterance 466, the test on line 6 skips the program to lines 10-13, which set "key" to UNDEF and "voice_confirm" to NO. Since the test on line 4 succeeded, lines 14-18 of "get_input()" are skipped, and since "key" has been set to UNDEF, the test on line 19 fails and "get_input()" returns to line 15 of FIG. 9 without calling "handle_response()".

Since "restart" is not set to one by the call to "get_input()", the test on line 15 of FIG. 9 fails, and the program advances to line 17. Line 17 prefilters the prefilter vocabulary of one thousand words down to a much smaller currently active vocabulary. Line 17.5 sets "found" to NO so that the loop starting on line 18 will be executed. Then lines 18 through 23 run recognition on utterance 466 against that currently active vocabulary. Once this recognition is complete, line 24 produces a display 468, shown in FIG. 26 of the word choices it produces. In the example of FIG. 26, NEW_UTT's recognition of utterance 466 is correct and the display 468 shows the correct word "this" as the first choice.

At this point, the program advances to LOAD2. There line 26 calls the alphabetic filtering function of FIG. 13. Since the initial string is empty, lines 5 and 6 of FIG. 13 set the prefilter vocabulary equal to the entire system vocabulary. Then line 27 of FIG. 9 causes the program to skip to line 32 of that figure, since "wordstart" is not NULL. Lines 32 through 39 run a second recognition, including prefiltering, upon utterance 466, this one against the entire system vocabulary. After the processing of each frame of this recognition, lines 28–30 of FIG. 9, which correspond to block 440' of FIG. 3, check if the operator starts a new utterance or types a key. In the example of FIG. 26, it is assumed that the operator does not make any such response during this period, so that the recognition of LOAD2 runs to completion and the program advances to line 40.

Since the "second_display_flag" has been set to NO on line 6 of FIG. 9, line 40 of FIG. 9 causes lines 41 through 46 to be skipped, preventing the display of the word choices of the LOAD2 recognition. As a result, the program advances to lines 47–51 of FIG. 9, where it waits for a response from the operator.

In the example of FIG. 26, the operator speaks the utterance 470, that is, the word "demonstrates", while the program is performing this loop. This points "nextwordstart" to the second utterance 470. The next time line 48 calls "get_input()", line 4 of FIG. 10 finds "wordstart," which still points to utterance 466, does not equal "nextwordstart", which points to the new utterance 470. As a result, "get_input()" sets "wordstart" equal to "nextwordstart", making utterance 470 the current utterance for recognition. Since line 6 of FIG. 10 finds that word choices 468 are currently being displayed, lines 7 and 8 of FIG. 10 sets "key" to the character one and "voice_confirm" to YES, indicating that the utterance 470 is to be treated as a voice confirmation of the first word in the display 468. Then the "get_input()" skips to line 19, where it calls "handle_response()", since "key" equals one.

At this point, the line 5 of "handle_response()", shown in FIG. 11, sets the variable "keynumber" to one, the integer value corresponding to the character value of "key". Then line 6 of FIG. 11 determines that "keynumber" equals the number of a current word choice, causing lines 7–13 of FIG. 11 to be executed. Line 7 erases the display 468. Line 7.5 sets "word" equal to "choice[keynumber]", which, in this case, is the first word of the "choice" array, the word "this". Then line 8 passes the ASCII spelling of the this word, followed by a space, as an output 472, shown in FIG. 26, to the application program. Once this output has been produced, lines 9, 10, and 12 set the "second_display_flag" to NO, "wordstart" to NULL, and "restart" to one. Line 11 does not set "nextwordstart" to NULL, because "voice_confirm" is YES, indicating that "nextwordstart" points to an utterance, the utterance 470, which is still to be recognized. Finally, line 13 of FIG. 11 returns to "get_input()", which then returns to line 49 of FIG. 9. Since "restart" has just been set to one, line 49 jumps to NEW_UTT on line 10 of FIG. 9 to start the recognition of the new utterance 470.

At this point, line 11 of FIG. 9 again clears the initial string, and line 12 gets a prefiltered vocabulary comprised of the 1,000 words considered by a language model to be most likely to occur after the word "this". Line 13 of FIG. 9 skips the program to line 17 of that figure, because "wordstart" points to utterance 470. Lines 17–23 perform prefiltering and recognition on utterance 470 against the vocabulary just selected in line 12. Once this recognition is done, line 24 makes a display 472, shown in FIG. 26, of the resulting word choices. This display contains no words, because the example of FIG. 26 assumes that the one thousand word vocabulary used does not contain any words which sound like "demonstrates", and thus that no word choices scored better than threshold.

At this point the program proceeds to LOAD2. There line 26 makes the entire system vocabulary the prefilter vocabulary, since the initial string is still empty. Since "wordstart" points to utterance 470, line 27 skips the program to lines 32 through 39, which perform recognition on utterance 470 against the entire system vocabulary. In the example of FIG. 26, the operator provides an input 474 during this LOAD2 recognition by pressing the "*" key on his keyboard, indicating that he wishes to see the results of recognition against the entire system vocabulary.

As is shown on line 35 of FIG. 9, and in block 440' of FIG. 3, the recognition algorithm calls "get_input()" after processing each frame to determine if the operator has pressed a key or spoken a new utterance. The next time "get_input()" is called after the input 474, the test on line 14 of FIG. 10 finds that a key has been pressed, and line 15 of that figure sets "key" to "*", line 16 sets "voice_confirm" to NO, and line 19 call "handle_response()". Lines 16–21 of "Handle_response()" are executed because "key" equals "*". Line 16 erases display 472. Line 17 places the prompt 476, shown in FIG. 26, on the screen. Lines 18 and 19 set "second_display_flag" to YES and "restart" to zero. Then line 20 causes a return to line 36 of FIG. 9. Once the program returns to line 36 of FIG. 9, it continues the recognition of lines 33 through 38 because "restart" equals zero, and thus the jumps on line 36 and 37 do not take place.

Once the recognition of lines 33 through 39 of FIG. 9 is complete, lines 41–46 are executed because pressing the "*" key has set the "second_display_flag" to YES. Line 41 performs no function since display 472 has already been erased. Lines 42 through 43 places the LOAD2 word choices into the "choice" array. Line 44 makes a display 478, shown in FIG. 26, of the LOAD2 word choices. Then line 45 sets the "second_display_flag" to NO. Once this has been done, the program advances to lines 47 and 51 where again it waits for the operator to enter new input.

At this point, in the example of FIG. 26, the operator provides input 480 by typing the '1' key. This causes the next call to "get_input()" to find that a key has been pressed, causing that function to set "key" to '1' and "voice_confirm" to NO, and to call "handle_response()". Line 5 of "handle_response()" sets "keynumber" to the integer one. Then "handle_response()" executes lines 8–13 of FIG. 11, because line 7 of that figure finds that word choices are currently being desplayed and that "keynumber" corresponds to a word choice of display 478. As a result, display 478 is erased, "word" is set to the best scoring word choice, "demonstrates", and the string "demonstrates" is provided as an output 482, shown in FIG. 26. In addition, "second_display_flag" is set to NO, "wordstart" to NULL, "restart" to one, and "nextwordstart" to NULL, since voice_confirm" has been set to NO by line 16 of FIG. 10, indicating that the system should wait for another utterance before performing the next recognition. Then "handle_response()" and "get_input()" return to line 49 of FIG. 9, which jumps to NEW_UTT for recognition upon the next utterance, because "restart" has been set to one.

Once the program returns to NEW UTT, it clears the initial string and gets the one thousand word subvocabulary determined by the system's language model to be most likely to follow the word "demonstrates". Then lines 13 through 16 waits for the operator to enter new input, since "wordstart" has been cleared, indicating that there is not yet an utterance available for recognition.

In the example of FIG. 26, the next input 484 provided by the operator is the typing of a sequence of keys which spell the word "alphabetic" followed by a space. When the first of these keys, 'a', is typed, the next call to "get_input()" from line 14 of FIG. 9 calls "handle_response()" with "key" set to 'a'. Since "key" has a letter value, line 29 of "handle_response()" causes lines 31-38 of FIG. 11 to be executed. Line 35 adds the value of "key", 'a', to the previously empty initial string. Lines 36-38 set "second_display_flag" to YES and "restart" to two, and then causes a return to line 15 of FIG. 9. Since "restart" has been set to two, line 15 of FIG. 9 jumps to LOAD2, which causes an alphabetically filtered vocabulary containing all vocabulary words starting with 'a' to be made the prefilter vocabulary. Then lines 27 through 31 of FIG. 9, cause the program to wait for more input, since "wordstart" is NULL.

When the operator types each successive letters of the word "alphabetic" the following takes place: "get_input()" calls "handle_response()" with "key" equal to the typed letter; lines 29 through 38 of "handle_response()" add the letter to the initial string and set "restart" to two; line 30 of FIG. 9 jumps back to the beginning of LOAD2, setting the prefilter vocabulary equal to those words in the vocabulary, if any, starting with the current initial string; and then the program waits on lines 27-31 for the next user response.

In the example of FIG. 26, after the operator types the entire word "alphabetic" he presses the space key. The next call to "get_input()" calls "handle_response()" with "key" set to the space character. Thus the test on line 51 of "handle_response()" causes lines 52 through 61 of that function to be executed. Line 53 sets "word" to the word ID of the word "alphabetic". Line 56 passes the string "alphabetic" to the application program, as is shown at 486 in FIG. 26. Lines 58 through 60 set the "second_display_flag" to NO, "wordstart" and "nextword" to NULL, and "restart" to one. Then Line 61 cause a return to line 29 of FIG. 9. Since "restart" is one, line 29 jumps to NEW UTT to start the recognition of a new word.

Once the program advances to NEW UTT, it again clears the initial string and gets a vocabulary of the one thousand words considered most likely to follow the word "alphabetic". Then lines 13-16 wait for the next operator input. According to FIG. 26, this next input 488 is the pressing of an 'f' key, indicating that the operator intends for the next word to start with the letter 'f'. The next time "get_input()" is called after the pressing of this key, it calls "handle_response()" with "key" equal to 'f'. This causes lines 29 through 38 of "handle_response()" to add 'f' to the just cleared initial string, and to set "second_display_flag" to YES and "restart" to two. Thus when the program returns to line 15 of FIG. 9, it jumps to LOAD2. As a result, line 26 of FIG. 9 sets the prefilter vocabulary to an alphabetically filtered vocabulary containing all the words of the system vocabulary which begin with the letter 'f'. Then, because "wordstart" is NULL, the "while" loop of lines 27-31 waits for operator input. This looping continues until the operator speaks utterance 490, shown in FIG. 26, which is the word "filtering". The next time line 28 of FIG. 9 calls "get_input()", line 4 of FIG. 10 finds that "nextwordstart" points to utterance 490, while "wordstart" is still NULL. Thus line 5 of FIG. 10 points "wordstart" to utterance 490. Since no word choices are displayed, lines 11 sets "key" to UNDEF, and thus "get_input()" does not call "handle_response()", but instead returns to line 29 of FIG. 9 with the new value for "wordstart".

Since the call to "get_input()" does not set "restart" to one or two, the program advances to lines 32-39 of FIG. 9, which perform prefiltering and recognition on utterance 490 against the alphabetically filtered vocabulary. Once this recognition is complete, line 40 finds that "second_display_flag" is YES, because of the call to "handle_response()" with "key" equal to 'f'. This causes lines 41-46 to display the word choices produced in that recognition, as is shown at 492 in FIG. 26.

After this display is put on the screen, lines 47-51 of FIG. 9 wait for the next operator input. In the example of FIG. 26, this is the utterance 494 of the word "and". The next call to "get_input()" on line 48 detects the new utterance, points "wordstart" to it, and calls "handle_response()" with "key" equal '1' and "voice_confirm" equal YES. Because "keynumber" equals the number of a current choice word, "handle_response()" executes lines 7-13 of FIG. 11. This erases the display 492, sets "word" to the first word choice, "filtering", and produces an output 496, shown in FIG. 26, equal to "filtering". This also sets "second_display_flag" to NO, "wordstart" to NULL and "restart" to one, and causes a return to line 49 of FIG. 9, which then causing the program to jump to NEW_UTT for the start of new recognition.

Once the program returns to NEW_UTT this time, it clears the initial string, and gets a prefiltering vocabulary of the one thousand system vocabulary words most likely to follow the word "filtering". In lines 17-23 it starts recognition on utterance 494. After this recognition, line 24 makes the display 498, shown in FIG. 26, of the word choices produced by it. The system then advances to LOAD2, where, since the initial string is empty, it loads the full system vocabulary and starts performing recognition on line 32-39.

In the example of FIG. 26, the operator decides he does not want to continue the dictated sentence with the word "and" spoken in utterance 494, and his next input 500 is the pressing of the DELETE key during the recognition of LOAD2. On the next call to "get_input()" on line 35 of FIG. 9, "get_input()" calls "handle_response()" with "key" equal to the DELETE character. As a result, lines 23-27 of "handle_response()" are executed. This erases display 498, sets the "second_display_flag" to NO, "wordstart" and "nextwordstart" to NULL, and "restart" to one, and then causes a return to line 36 of FIG. 9, from which the program jumps to NEW UTT to wait for the recognition of the new utterance.

Thus it can be seen from FIG. 26 that the total output produced in response the input of column 460 is the phrase "this demonstrates alphabetic filtering". It can also be seen that the use of two recognitions, that in NEW_UTT and that in LOAD2, speeds up the average rate of recognition. The entire system vocabulary is assumed to be approximately 20,000 words, whereas the vocabulary run in NEW_UTT is only one thousand words. Thus the recognition which NEW_UTT performs on most words is relatively quick, because it involves comparisons against a relatively small number of words. Since nine out of ten spoken words occur in the one thousand most common words, the quick recognition in NEW_UTT usually displays the spoken word as one of its word choices. The percent of times which the spoken word occurs within one of NEW_UTT's word choices is increased by its use of language model vocabulary filtering. However, in that percent of the time when NEW_UTT fails to display the intended word, the used can select the running of the entire vocabulary, or an alphabetically filtered subset of it, in LOAD2. Furthermore, it can be seen that system's use of alphabetic filtering greatly speeds recognition, particularly of relatively rare words, by limiting the vocabulary to words starting with an initial string type in by a user. Such a vocabulary limiting string can be selected either before, during and after the recognition of a word. It should be clear to those skilled in the art that the program disclosed in FIG. 9 and its related functions can be modified so as to limit the time in which the system is capable of responding to the selection of an initial string, if so desired. It should also be understood that the above-described preferred embodiment does not require the operator to select an initial string for each word that is spoken, although it gives him the option to do so if he finds the most convenient.

The program of FIG. 9 can easily be modified so that word choices produced by the LOAD2 recognition are automatically displayed in addition to word choices produced by the recognition in NEW UTT. This can be done by replacing lines 40–46 of FIG. 9 with the lines 1–4 of FIG. 16. If the instructions of FIG. 16 are used, an instruction should also be inserted at the beginning of NEW UTT to clear the "choice" array before each recognition by setting "choice[0]" to zero. This prevents word choices from a previous utterance from being displayed when the program advances to LOAD2 without performing a recognition against the current utterance in NEW_UTT.

Referring now to FIGS. 17-25 and FIGS. 7-8, a second preferred embodiment of the present invention is shown. This second embodiment differs from the first in that it handles the recognition of a plurality of prerecorded words, including continously spoken words, and in that it enables the selection of word choices and initial strings by voice.

FIG. 8 provides the C program for the "main()" function of the second preferred embodiment of the present invention. This function corresponds generally to the "main()" function shown in FIG. 9, but does contain a number of differences.

BEGIN in FIG. 17 initializes "word" and "wordstart", like BEGIN in FIG. 9. But the BEGIN of FIG. 17 differs from that of FIG. 9 in the following ways: (1) It does not initialize "second_display_flag", because that variable is not used in the second preferred embodiment. (2) Line 7 of FIG. 17 sets "wordstart" to "bigstart", the start of the big frame buffer 102. The buffer 102 is called the "big" buffer in the second embodiment because this embodiment uses two frame buffers, the big buffer 102, which is the same as the buffer 102 described above and which is sufficiently long to record a plurality of words, and a small buffer into which discrete utterances for selecting word choice or initial strings are recorded. (3) Line 8 also sets a pointer "bigwriteptr" to "bigstart". "Bigwriteptr" points to the address in big buffer 102 at which frames produced from the prerecorded audio on disc 482 are recorded.

NEW_UTT in FIG. 17 corresponds roughly to NEW_UTT in FIG. 9. Line 10 of FIG. 17 sets a variable "response_time_limit" to null. As is explained below, when the second embodiment displays word choices, it sets a response time during which the operator can respond to the display. If he does not respond in that time, the system considers the best scoring word choice confirmed, and proceeds to recognize a subsequent portion of speech. "Response_time_limit" is the time at which the response time for the current display ends. When there is no current display, "response_time_limit" is set to NULL.

Lines 11 and 12 of FIG. 17 are identical to lines 11 and 12 of FIG. 9. They serve to clear the initial string and to get an initial prefilter vocabulary of one thousand words based on the previous word, if any, recognized by the system.

Line 13 of FIG. 17 calls a function "get_frames()", shown in FIG. 18. This function comprises a "for" loop, which is constantly repeated until the loop is exited by the "return" instructions on lines 14.5 or 22, or the "exit_program()" function on line 18.

When entered, this loop performs a test a line 7 to determine if "wordstart" is within one frame block length of "bigwriteptr" in the circular buffer 102. In the second preferred embodiment, a frame block length is equal to one hundred and fifty frames, or approximately three seconds of speech. In this embodiment, the buffer 102 stores four such frameblock lengths, that is, six hundred frames or twelve seconds of speech. If "bigwriteprt" is more than a frame block ahead of "wordstart", it indicates that there are more than three seconds of speech left for recognition. If this is true, line 7 causes a skip to line 22, causing "get_frames()" to return to FIG. 17 without performing any functions. But if there are less than three seconds of frames between "wordstart" and "bigwriteptr", the system gets more frames by executing lines 8-20 of FIG. 18.

Line 8 of FIG. 18 checks if there is any more audio data recorded in the audio file on disk 482 from which such data is being read. It does this by calling a function which tests if the file pointer from which data is being read is at the end of the audio file. If not, lines 9 and 10 call the function "read_fblock_from_file()" of FIG. 21, which converts one frame block worth of audio data from disk 428 into frames and records them into big buffer 102. Line 6 of the function "read_fblock_from_file()" calculates into which of the big buffer's four frame blocks the frame are to be recorded. Line 7 of FIG. 21 gets the starting position in the current file of the audio data from which the frame block is to be derived, and stores it in an array "fblock_fileadr" indexed under the frame block number calculated in line 6. Lines 8 and 9 perform the major task of the function. They read a frame block length of digitally compressed audio data from disc 482, through disc controller 430 of FIG. 1, through audio compression/decompression circuit 422 in digitally uncompressed form, to FFT circuit 46, from which is supplied by line 56 to CPU 64, which writes it into big buffer 102 at the position pointed to by "bigwriteptr". Line 10 of FIG. 21 saves the current value of the file pointer as "file_fblock_ptr", for use by the next call to "read_fblock_from_file()".

After lines 9 and 10 of "get_frames()" have read a frame block into big buffer 102, line 11 of that function tests if the program is in the playback mode. Although not shown in the figures, it is assumed that the operator has means for setting a variable "playback" to YES, indicating the system is to be used in a playback mode, in which a previously recorded audio file is transcribed, or to get a variable "insert" to YES, indicating the system is to be used in an insert mode, in which an operator speaks a sequence of continuous speed into a file on disk 428 and then the program of the second preferred embodiment is immediately called to transcribe that speech.

If "playback" is YES, a function "read_aloud_from_file()" is called on lines 12, 13 and 14 to let the operator hear the portion of speech being recognized, so that he can correct the system if it makes recognition errors. This function plays back three seconds of audio from disk 428, starting with the audio corresponding to the frame in buffer 102 currently pointed to by "wordstart". The call to "read_aloud_from_file()" determines which three seconds of audio to play back by its call, on line 13 of FIG. 18, to the function "calc_fileadr_of()". "Calc_fileadr_of()", shown in FIG. 22, calculates the address in the audio file corresponding to the frame pointed to by "wordstart". Line 3.5 of "calc_fileadr_of()" calculates "framenumber", the number of "wordstart's" frame within the big buffer. Line 4 calculates "wordstart's" current frame block number, a number identifying which of the big buffer's four frame blocks "wordstart's" frame is in. Lines 5 and 6, calculate "extra_bytes", the offset, in the audio file of "wordstart's" frame from the start of its frame block. Then line 7 of FIG. 22 adds the "extra_bytes" offset to the audio file position of the start of "wordstart's" frame block, and returns the resulting sum as the audio file address corresponding to "wordstart".

Returning now to "get_frames()" on FIG. 18, if, on the other hand, the test on line 8 finds that the audio file pointer is at the end of the audio file, the program skips to lines 15–21. If the program is in the playback mode, line 16–18 informs the operator that playback is complete and exits from the playback program. If the program is in the insert mode, lines 19–21 prompt for more speech and then causes the "for" loop of "get_frames()" to be repeated until the operator speaks more words into the audio data file. After such speech, the next pass through the "for" of FIG. 18 will find, at line 8, that the disc was not at the end of the file and thus it would read up to 150 frames of such speech into the big frame buffer before returning to the "main()" program in FIG. 17.

Figure 7:
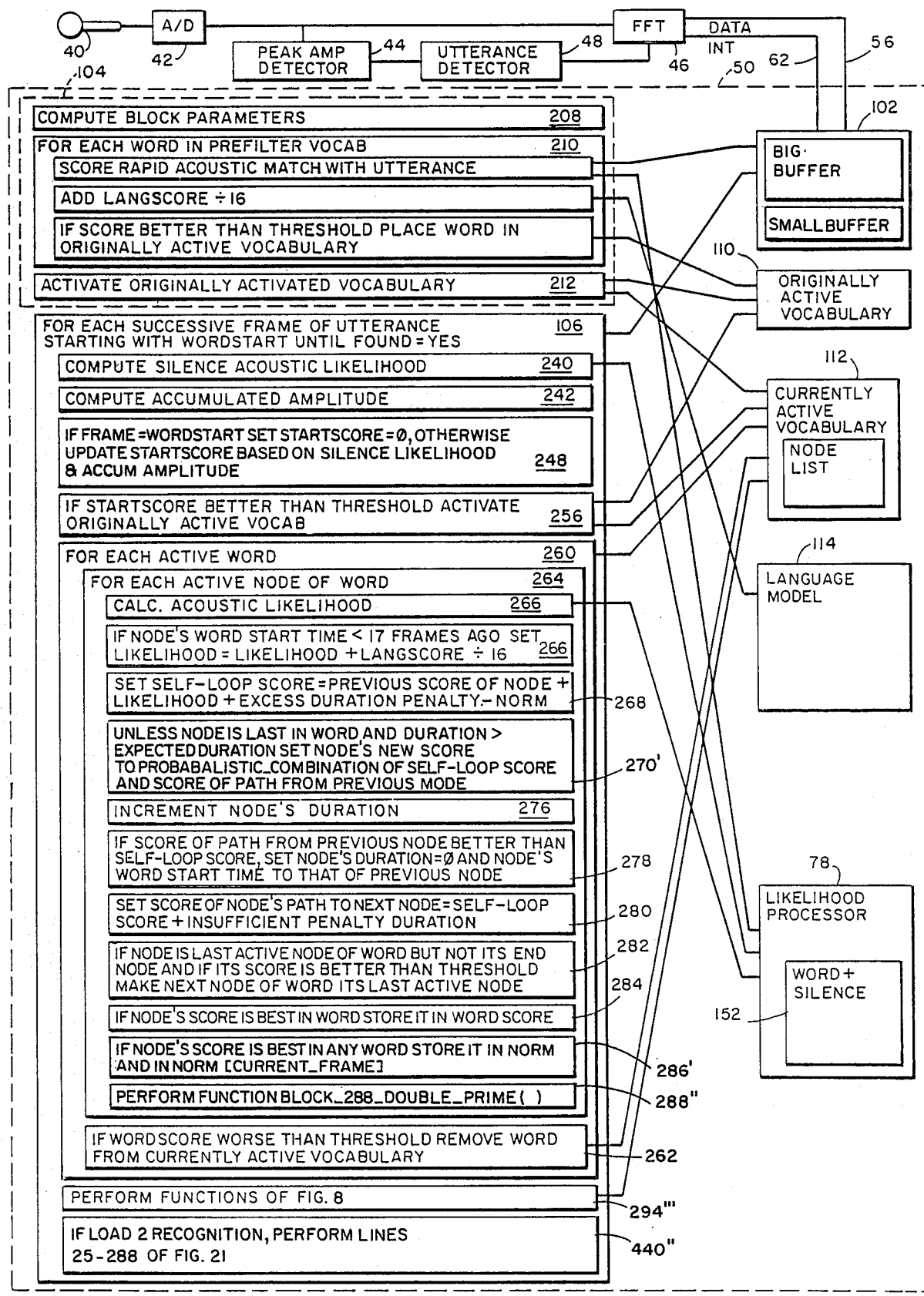
FIG. 7 is a schematic block diagram similar to that shown in FIG. 3 as changed for use in a second preferred embodiment of the present invention.

Upon the return from "get_frames()", "main()" advances to line 14 of FIG. 17, where it performs prefiltering of the type shown in the functional block 104 of FIG. 7. This prefiltering is identical to that shown in block 104 of FIG. 3, described above.

One prefiltering has been performed, the program advances to line 14.5 which sets the variable "found" to NO. As is explained above with regard to lines 17.5 and 32.5 of FIG. 9, "found" is set to NO so that the loop starting on the next line will be executed.

After "found" has been set to NO the program of FIG. 17 advances to lines 15 and 16 where it performs the recognition shown in functional block 106' of FIG. 7. Block 106' of FIG. 7 is similar to block 106 of FIG. 3, described above, and block 106 of FIG. 8 of the previous U.S. patent application No. 797,249. In fact, block 106' is identical to block 106 of the that previous application with the following exceptions:

(1) Block 106' replaces block 248 of the previous application with a block 248'. Block 248' acts exactly like block 248 of the previous application, except when the frame against which dynamic programming is being performed is pointed to by "wordstart". In this case it sets "startscore" to zero, treating "wordstart's" frame as if it were preceded by silence. As is described in the previous application, "startscore" is the "passscore" for the first node of each word model. Setting "wordstart's" frame's "startscore" to zero causes step 278 of FIG. 7 to seed, or begin, dynamic programming of each word model in the currently active vocabulary. This is necessary because in continuous and connected speech, which the second preferred embodiment of the present invention is designed to recognize, there is often not enough silence between words to let "startscore" seed word models in the absence of such forced seeding.

(2) Block 106' does not contain a block 254. In the previous application block 254 makes a vocabulary word's score worse if an utterance being recognized extends past the end of that word, as determined by the dynamic programming. In a distance recognition system, where the utterances to be recognized correspond to individual words followed by silences, this is useful. But it is inappropriate for a continuous or connected speech recognizer, in which utterances to be recognized normally correspond to more than one vocabulary word.

(3) Block 106' replaces block 270 of the previous application with a block 270'. Block 270' acts exactly like block 270 of the previous application unless the current node is the last node in its word and the duration of that node is greater than its expected duration, in which case block 270' does nothing, leaving the node's score unchanged. This change in block 270', in conjunction with the deletion of block 254 described above, causes the scoring of a word to terminate once the last node of that word exceeds its expected duration. This is appropriate for continuous and connected speech recognition, in which there are no pauses between words, because otherwise the score of a word would constantly be degraded as its last node was compared against frames associated with the utterance of successive words to be recognized.

(4) Block 106' replaces block 286 of the previous application with a block 286'. Like block 286 of the previous application, block 286' stores the current node's score in "norm" if it is the best score so far for the current frame, but in addition block 286' also stores any such best scoring node score in an array "norms" indexed under the current frame number. The resulting array of "norms" values, one for each frame of the dynamic programming process, enables an unnormalized word score to be calculated in block 288', discussed below.

(5) Block 106' replaces block 288 of the previous application with a block 288'', shown as a C function "block_288_double_prime()" in FIG. 24. This function is similar to FIG. 24 of the previous application. The major difference being that block 288'' calculates a "compensated_endscores", and "endscore" compensated for differences in word length. Line 4 of "block_288_double_prime()" checks if the current node is the last in its word, since only scores for the last nodes of words should be used for word scores, it checks if the current node's duration is less than or equal to its expected duration, since the scoring of a word stops once the duration of its final node execeeds its duration. If these conditions are not both met the function returns without performing any further function. If they are both met, lines 6 sets "compensated_endscore" to the current node score, and lines 7 and 8 adds to this score all the "norm" values subtracted from it by block 268 of FIG. 7 during each frame of its dynamic programming. This makes "compensated—endscore" approximate the negative logarithm of its associated word's likelihood. Then lines 9 and 10 divide "compensated—endscore" by the number of frames time aligned against its associated word. This produces the word's average likelihood score per frame, which provides a better basis for comparison between words of different lengths than an absolute likelihood, since long words have worse absolute likelihood scores than short words. This is because frames seldom match node models exactly, causing each successive frame against which a word is matched to worsen its absolute likelihood score. Once a "compensated—endscore" has been calculated for the current node, the loop of lines 15-25 of FIG. 24 finds, in lines 16-18, which of the four best "endscores" has the worst score. If the current word is the word "bestword" associated with one of the four best "endscores", lines 21-23 of the loop set that "endscore" to the "compensated—" just calculated. These lines also set that "endscore's" corresponding variable "endframe", which represents the last frame time aligned against its corresponding word, to the current frame, and a flag "already—a—bestword" to YES, indicating that the current word is already among the four best scoring words. After this loop ie completed, lines 26 and 27 test if both (a) "compensated—endscore" is better than the worst of the four best "endscores" and (b) the current word is not already one of the four best scoring words. If this test is met, lines 28 through 30 replace the fourth best endscore with the "compensated—endscore", set the "endframe" associated with the new "endscore" to the current frame, and set "bestword" associated with the new "endscore" to the current word.

(6) Block 106 replaces block 294 of the previous application with the block 294''', shown in FIG. 11. Block 294''' is identical to block 294'' discussed above with regard FIG. 6, except that (a) its step 324', in addition to making arrays "endscore—ord" and "bestword—ord", also makes an array "endframe—ord" of the frame time aligned with the end of each of the four best scoring words, and (d) it includes an additional function 462, shown in FIG. 25, which transfers each element of the "endframe—ord" array to a corresponding array "wordend" for each element of "endscore—ord" with a score better than threshold.

(7) Finally, block 106' contains a block 440'', similar to the block 440' described above with regard to FIG. 3, which is performed after the dynamic programming for each frame has been completed. Block 440'' tests if a LOAD2 recognition of FIG. 17 is being performed. If not, block 440'' performs no further functions. If so, the block performs the step shown in lines 25 through 29 of FIG. 17, which are described below.

Returning now to the function "main()" in FIG. 17, after recognition is performed in lines 15 and 16 of that figure, line 17 displays the word choices produced by that recognition in the manner described above with regard to FIG. 9. Then line 18 of FIG. 17 sets "response—time—limit" to the current time plus the length of the response period, preferably half a second to a second.

Line 20 begins the LOAD2 portion of FIG. 17, which is similar to the LOAD2 portion of FIG. 9, described above. Line 21 of FIG. 17 calls "get—alphabetically—filtered—vocabulary()", described above with regard to FIGS. 9 and 13. This sets LOAD2's prefilter vocabulary to the entire system vocabulary, if the initial string is empty, or to an alphabetically filtered subset of that vocabulary, if the initial string contains characters. Next lines 22-30 perform prefiltering and recognition in the same manner as lines 14-16, except that in LOAD2, block 440'' of FIG. 7 causes the instructions on lines 25-29 of FIG. 17 to be executed.

Line 26 calls the function "check—for—response()", shown in FIG. 19, which corresponds roughly to the function "get—input()" described above with regard to FIGS. 9 and 10. Like "get—input()", "check—for—response()" starts by setting "restart" to NULL. Then line 5 checks whether the variable "voice—response" is YES.

FIG. 23 shows the interrupt routine called by utterance detection interrupts in the second preferred embodiment of the invention. Line 4 of this interrupt routine calls a function "response—time()" which returns YES if the "response—time—limit" is greater than the current time, indicating that it is currently time for an operator to respond to a display of word choices. If it is such response time, line 5 calls the function "enable—recording—in—small—buffer()", which causes the detected utterance to be recorded in the small buffer used for recording voice responses to displays. This function is disabled as soon as either the small buffer is filled or there is one half second of silience. As was discussed above with regard to FIG. 14, the frames produced by FFT cirucit 46 should be buffered in a 16 frame buffer, so that once an utterance is detected the 16 frames occurring before that utterance detection, as well as frames occurring after the utterance detection are available for recording, in this case, in the small buffer. Line 7 of FIG. 23 then sets "voice—response" to YES and exits the interrupt routine. As can be seen from FIG. 23, "voice—response" is set to YES only if the operator starts an utterance during a response time. If an utterance is detected at any time other than a response time, it is ignored.

Returning now to "check—for—response()", if line 5 of FIG. 19 finds "voice—response" is YES, it causes lines 6-12 to be executed. Line 6 resets "voice—response" to NO, so it will be NO until the next utterance is detected during a response time. Then lines 6.5 sets the prefilter vocabulary pointer to the response vocabulary pointer, making the prefilter vocabulary equal to the relatively small set of words which are legel responses to the display of word choices. Lines 7-9 perform prefiltering and recognition identical to that performed on line 14-16 of FIG. 17, except that the results of the recognition are placed in an array "r—choice" rather than the array "choice". After this recognition has been performed, the variable "response" is set equal to the first, or best scoring, element of the "r—choice" array. Then line 11 sets "key" equal the key associated with the word stored in "response". For example, if the operator responds to the display of word choices by saying "pick—1," "key" is set to '1'; if he says "pick—2", "key" is set to '2'; and so on. Similarly, if he says "restricts—AB", meaning that the initial string should have "ab" added to it, "key" will be set to 'a',the first character associated with that restrict command. Then line 12 sets "keystring" to the value returned by "response—keystring()". "Response—keystring()" returns NULL unless "response" is an initial string limiting response, such as "restrict—A—B", in which case it sets "keystring" to the string designated by the response. Thus, if "response" is "restrict—A—B," "keystring" is set to "ab". Once lines 11 and 12 have been executed, line 21 calls "handle_response()".

If, on the other hand, line 5 of "check_for_response()" finds "voice_response" is NO, indicating that there has been no response time utterance detected since the last call to "check_for_response()", the program skips to line 23, which checks if the keyboard has been hit. If so, lines 24-26 set "key" to the character of the key struck, set "keystring" to a string comprising the key struck, and then call "handle_response()".

If there has been neither a voice response nor a key struck since the last call to the function, the tests on lines 5 and 23 both fail and "check_for_response()" returns without performing any functions.

If "check_for_response()" calls "handle_response()", the program executes the instructions contained in FIG. 20. The function "handle_response()" shown in FIG. 20 is basically similar to that discribed above with regard to FIG. 11. Line 6 of FIG. 20 sets "keynumber" to integer value of "key" if "key" is a number character. Then line 7 tests if "keynumber" corresponds to one of the numbered word choices. If so, lines 8-13 are executed. Line 8 sets "word" equal to the selected member of the "choice" array. Line 9 sets "wordstart" for the next recognition equal to the "workend" of the selected word, which is the frame in big buffer 102 determined by the dynamic programming to be the end of the selected word choice. This technique of using the end of a confirmed word to pick the start of the next word to be recognized greatly reduces computation, since finding wordstarts is a major problem in continous speech recognition. In alternate embodiment of this invention, this technique can be further improved to take account of the smearing and sharing of word boundaries which occur in continous speech. But each without such improvements, the second preferred embodiment is capable of recognizing continous speech, particularly when used in conjunction with alphabetic filtering and the selection word choices.

Line 10 of FIG. 20 erases the current word choice display, if any. Line 11 passes a string comprised of the just confirmed word, followed by a space, as output to the application program with which the speech recognition program is being used. Line 12 sets "restart" to one, indicating the program should jump to NEW_UTT and start recognition upon a new word. Then line 13 returns to "get_input()".

If "handle_response()" is called with "key" equal to "*", indicating that the operator wants to see the results of recognition against the entire system vocabulary, the test on line 15 of FIG. 20 is met and lines 16-20 are executed. Line 15.5 erases the current display of word choices, if any. Line 16 sets "response_time_limit" to NULL, so that line 31 of FIG. 17 will display word choices from the full vocabulary recognition of LOAD2. Line 17 prompts the operator that recognition is being run against the full vocabulary. Line 18 sets "restart" to zero, and line 19 returns.

If "handle_response()" is called with "key" equal to an alphabetic character, line 21 of FIG. 20 causes lines 22 through 25 to be executed. Line 22 erases any displayed word choices. Line 22.5 sets "response_time_limit" to NULL, indicating that the system should not expect a response from the user until the results from the recognition against an alphabetically filtered vocabulary have been displayed. Line 23 adds the alphabetic characters contained in "keystring" to the initial string. Line 24 sets "restart" to two. Then Line 25 returns.

If "handle_response()" is called with "key" equal to the space character, line 27 of FIG. 20 causes lines 28-35 to be executed. Line 28 erases current word choices, if any. Line 29 sets "word" equal to the word ID, if any, corresponding to the initial string. Line 32 passes the characters contained in the initial string followed by a space to the application program as an output. Line 34 sets "restart" to one. Then line 35 returns.

Once "handle_response()" returns to "check_for_response()", "check_for_response()" returns to the portion of "main()" in FIG. 17 from which it has been called.

Returning now to our description of FIG. 17, once the call to "check_for_response()", which is made on line 26 of FIG. 17 after the processing of each frame of the LOAD2 recognition, returns, line 27 jumps to NEW_UTT to start recognition of the next prerecorded word if "restart" has been set to one, and line 28 jumps to LOAD2 to start another recognition of the same word against a restricted vocabulary if "restart" has been set to two. If neither of these jumps aborts the LOAD2 recognition, line 28A performs a test after each frame of the LOAD2 recognition to see if a set response time has expired. This is done by checking to see if both (1) a response time was started, as is indicated by "response_time_limit" being non-NULL, and (2) that response time has elapsed, as indicated "response_time()" returning NO. If these two conditions are met, line 28B jumps to TIME_OUT on line 44.5 of FIG. 17. This causes LOAD2 recognitions performed during the display of word choices to be aborted if the user does not respond within the time out period. However, it prevents LOAD2 recognitions requested by the operator, such as by typing of the "*" key or an alphabetic key, from being aborted by time outs, since "handle_response()" sets "response_time_limit" to NULL in response to those requests.

If the recognition performed on lines 23 through 30 is completed, line 31 tests if there are no word choices being displayed. If none are, lines 33-36 places the LOAD2 recognition word choices into the "choice" array and places the "wordends" of those word choices into the "wordend" array. Then line 37 displays those word choices into the "wordend" array. Then line 37 displays those word choices and line 38 sets "response_time_limit" to give the operator the standard response time to respond to the new display of word choices.

Lines 40 through 44 contain a "while" loop which is repeated as long as it is the response time for the current display of word choices. This loop is reached after the LOAD2 recognition is completed, whether or not the test on line 31 is met. During this looping, the program continues to check for a response from the operator. If the response sets "restart" to one, indicating that a new utterance should be recongnized, line 42 jumps to NEW_UTT. If the response sets "restart" to two, indicating that a second recognition should be run on the current word, line 43 jumps to LOAD2. If no such response is made before the end of the response time, the program exits the "while" loop and advances to TIME_OUT, the final portion of FIG. 17.

TIME_OUT on line 44.5 of FIG. 17 should only be reached if the operator has not responded to a display of word choices within the response time. If this is the case, lines 45-47 acts as if the operator has approved the best scoring word choice by pressing the '1' key. They do this by setting "key" to 1, calling "handle_response()", and then jumping to NEW_UTT to start recognition upon the next word.

Figure 27:
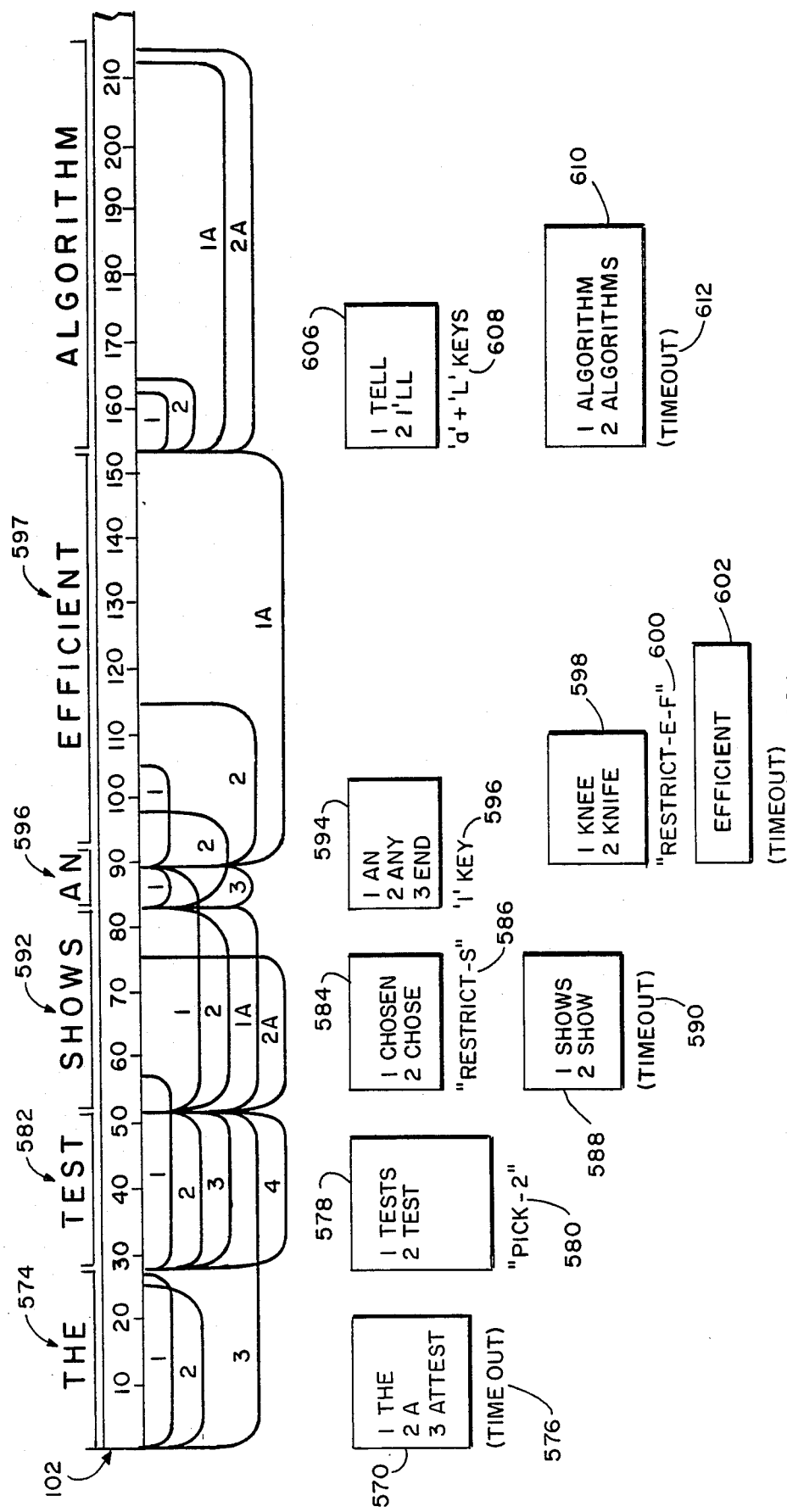
FIG. 27 represents sample input for use with the second preferred embodiment of the present invention, showing the displays made by the system, the responses made to the displays by an operator, and the selection of word ends and word starts by the system.

Referring now to FIG. 17, the operation of the second preferred embodiment to the present invention is explained in conjunction with a sample transcription. FIG. 27 shows a sample input comprised of the prerecorded words "the test shows an efficient algorithm". It also shows the displays which the program places on the screen in response to such input, and an operator's responses to those displays. The figure also schematically represents a portion of the big buffer 102 to show how the program uses the confirmation of displayed words to determine where to start the next portion of prerecorded speech to be recognized.

When the program of FIG. 17 is entered at the beginning of the sample session shown in FIG. 27, it initializes variables on lines 4 through 8, and then advances to NEW_UTT, where it sets "response_time_limit" to NULL and clears the initial string. Line 12 sets the prefilter vocabulary equal to the one thousand words most likely to occur when the last word recognized by the system is unknown.

Line 13 calls "get_frames()", which, on line 7 of FIG. 18, finds that "wordstart" is equal to "bigwriteptr", causing lines 8-10 of that figure to read three seconds of audio data from hard disc 428, convert it into one hundred and fifty frames, and write those frames into the big buffer 102 at "bigwriteptr", which initially points to the start of that buffer. In the example of FIG. 27, it is assummed that all of the prerecorded speech shown in that figure, except the end of the word "efficient" and the word "algorithm" fits into this first frame block. This is indicated by the number representing the one hundredth and fiftieth frame of buffer 102 shown under the end of the the word "efficient". Since "wordstart" points to the start of this first frame block, lines 12 through 14 of "get_frames()" play back the audio corresponding to that frame block for the operator to hear. Then line 14.5 causes "get_frames()" to return to line 14 of FIG. 17.

Lines 14-16 of FIG. 17 perform recognition upon the frame block just loaded into the big buffer, starting at its first frame, that pointed to by "wordstart". Once this recognition is complete, line 17 places the display 570 of the resulting word choices on the screen. The arcs labeled 1, 2 and 3 above the display 570 in FIG. 27 indicate the frames time aligned against each of the correspondingly numbered word choices of that display. The frames time aligned against the words "the" and "a" (pronounced to rhyme with "ah") are found to end near the ending of the actual utterance "the", as is indicated by the arcs 1 and 2 above display 570. But the arc labeled 3 above that display indicates that the dynamic programming found the end of the word "attest" to correspond to the end of the actual utterance "test". Thus it can be seen that the time alignment of different words end at different places in buffer 102.

After the line 17 of FIG. 17 makes the display 570 of word choices, line 18 sets the response time so that the user has approximately one second to respond to that display. Then the program begins the LOAD2 portion of "main()". Line 21 sets the prefiltering vocabulary to the entire system vocabulary, since the initial string is empty. Lines 22-30 perform prefiltering and recognition of the portion of speech pointed to by "wordstart", against the entire system vocabulary. During this recognition, after processing each frame, lines 25-28B check if the user has made a response by voice or by "key", and if the response time set on line 18 has expired. In the example of FIG. 27, the operator does not make a response to display 570, as is indicated by the word "TIMEOUT" 576. In addition the time out expires before LOAD2 completes recognition against the entire system vocabulary. As a result lines 28A and 28B of FIG. 17 cause a jump to TIME_OUT on line 44.5 of that figure.

TIME_OUT calls "handle_response()" with "key" equal to '1'. As a result, lines 8-13 of "handle_response()" are executed. They sets "word" equal to the first element of the "choice" array, the word "the", and set "wordstart" to the first element of the "wordend" array, which is the end of the arc 1 above display 570 in FIG. 27. Then they erases display 570, pass the string "the" of the application program, set "restart" to one, and causes a return to "main()", which on line 47 of FIG. 17 jumps to NEW_UTT to start recognition of the next word.

Once the program reaches NEW_UTT for the second time, it sets "response_time_limit" to NULL, clears the initial string, and loads a prefilter vocabulary of the one thousand words most likely to occur after the word "the". Then line 13 calls "get_frame()". Line 7 of "get_frames()" tests if "wordstart" is within one frame block of "bigwriteptr". At this point, "bigwriteptr" points to the first frame of what will be the second frame block of buffer 102, and thus is less than one frame block ahead of "wordstart", which points to the end of the utterance "the" in the first frame block. Thus, the test on line 7 is met and the program checks on line 8 of FIG. 18 if the there is more data in the audio file. Assuming there is not, lines 9 and 10 cause another one hundred and fifty frame's worth of digitally compressed audio data on the hard disc 428 of FIG. 1 to be converted into frame data and written into buffer 102 at the "bigwriteptr". Once this has been completed, lines 11 through 14 cause three seconds of audio, starting with the audio corresponding to "wordstart", currently the end of the utterance "the", to be played back to the listener. Then "get_frames()" returns to line 14 of FIG. 17.

Lines 14-16 perform prefiltering and recognition on the portion of speech pointed to by "wordstart", using the current one thousand word vocabulary. Once this is done, line 17 diplays the choices of that recognition by making display 578, shown in FIG. 27. Then the program sets a response time and advances to LOAD2. LOAD2 makes the prefiltering vocabulary the entire system vocabulary, since the initial string is clear. Then lines 22 through 30 run recognition against the entire system vocabulary, checking at the end of every frame of dynamic programming to see if the user has made a response or if the response time has elapsed.

In the example of FIG. 27, the operator makes the utterance "pick_2" during this LOAD2 recognition. He does this because the second word choice in display 578, the word "test" is the correct word. As is stated above with regard to FIG. 23, the detection of an utterance during a response time causes that utterance to be recorded in the small buffer and sets "voice_response" to yes. Thus, the next time "check_for_response()" is called by the LOAD2 recognition, line 5 of "check_for_response()" finds "voice_response" is yes. This indicates the detection of the response utterance, causing lines 6-22 of FIG. 19 to be executed. Lines 6.5 through 9 perform speech recognition on the response utterance. Once this recognition has been completed, line 11 sets "key" equal to '1', the value associated with the response word "pick—2", and line 21 calls "handle—response()". Since "key" corresponds to the number of a word choice, line 6 through 13 of "handle—()" are executed. They set "word" equal to the second word in the "choice" array, "test", and they set "wordstart" equal to the "wordend" associated with that second word choice, that indicated by the end of arc 2 above display 578 in FIG. 27. Then these instructions pass the string "test" to the application program, set "restart" to one, and cause a return to line 27 of FIG. 17, which jumps to NEW—UTT, because "restart" has been set to one.

Thus, the program advances for the third time to NEW—UTT, this time to begin the recognition on the portion of speech starting at the current value of "wordstart," the end of the utterance "test." Again NEW—UTT sets "response—time—limit" to NULL and clears the initial string. Then it gets a prefilter vocabulary of the one thousand words most likely to occur after the word "test." It calls "get frames()", but since "bigwriteptr" currently points to the start of what will be the third frame block in buffer 102, and since "wordstart" still points to a frame in the first frame block, the test on line 7 of FIG. 18 fails, and "get—frames()" returns without reading any frames into the big buffer. Lines 14–16 of FIG. 17 perform recognition against the current portion of speech, and once this recognition has been completed, line 17 makes the display 584 of the results and line 18 sets the response time. Then the program advances to LOAD2, which starts a second recognition on the current portion of speech using the full system vocabulary.

In the example of FIG. 27, the operator speaks the utterance "restrict—S" during this LOAD2. He does this because the word choices of display 584 are incorrect, and he wants to rerun recognition against a vocabulary of words starting with the letter with which the correct word, "shows", starts. The detection of this utterance 586 causes it to be recorded into the small frame buffer and sets "voice—response" to YES. The next time the LOAD2 recognition calls "check—for—response()", line 5 of that function finds "voice—response" is YES and, thus, runs recognition against the response utterance. In the example of FIG. 27, this recognition correctly determines the bests scoring response word to be "restrict—S". Then lines 10–12 of FIG. 19 set "key" to 's', the character corresponding to "restrict—S", and "keystring" to the string "s", the string corresponding to that response. Line 21 of "check—for—response()" then calls "handle—response()". Since "key" is 's', line 21 of "handle—response()" causes lines 22 and 25 of that function to be executed. These instructions erase display 584; they add the "s" in "keystring" to the previously empty initial string, they set "restart" to two, and then they cause a return to line 27 and 28 of FIG. 17.

Once the program returns to FIG. 17, line 28 jumps to the start of LOAD2, because "restart" has just been set to two. There line 21 sets the prefilter vocabulary equal to words in the system vocabulary starting with 's'. Then lines 22–30 run recognition on the current portion of speech against this alphabetically filtered vocabulary. Once this LOAD2 recognition is complete, line 31 tests if no word choices are displayed. Since none are, lines 32–39 make the display 588, shown in FIG. 27, of the alphabetically filtered word choices and set a response time.

In the example of FIG. 27, the operator makes no response to display 588, since he approves of its first choice, "shows". Thus the program advances to TIME—OUT, which sets "key" to '1' and calls "handle—response()". This sets "word" equal to the best scoring word choice, "shows", passes that word, followed by a space, to the application program, and causes the "wordend" associated with "shows", that indicated by the end of the arc 1A above display 580, to be the next "wordstart". Once "handle—response()" returns, line 47 of FIG. 17 jumps to NEW—UTT.

The fourth time the program advances to NEW—UTT, it sets "response—time—limit" to NULL, clears the initial string, and sets the prefilter vocabulary to the one thousand words determined by the language model most likely to occur after the word "shows". The call to "Get—frame()" returns without loading any frames, because there are more than 150 frames between "wordstart" and "bigwriteptr". NEW—UTT performs recognition on the current portion of speech, that pointed to by "wordstart", at the end of the utterance of the word "shows". Then the result of this recognition, which shows "an" as the first word choice, is presented as display 594 in FIG. 27, and a response time is set. After this is done, LOAD2 starts recognition on the current portion of speech against the entire system vocabulary.

According to example of FIG. 27, at this point the operator presses the '1' key to confirm the first word choice "an". This causes the LOAD2 recognition's next call to "check—for—response()" to confirm "an" as the selected "words", to pass "an" to the application program, to set "wordstart" to the last frame time aligned against "an", and to set "restart" to one. After all this is done, line 27 of FIG. 17 jumps to NEW—UTT.

The fifth time the program advances to NEW—UTT, the current portion of speech pointed to by "wordstart" is that starting with the last frame time aligned against the word "an". Because of the test on line 4 of "block—288—double—prime()", described above, the "endframe" and thus the "wordend" associated with each displayed word choice cannot extend past the frame at which the last node of that word choice equaled that last node's expected duration. The example of FIG. 27, assumes that the "n" sound at the end of utterance of "an" is longer than the average duration of the "n" sounds of that word. This points "wordstart" somewhere in the middle of that "n" sound, causing a portion of that "n" sound to carried over to the current portion of speech to be recognized. Thus when NEW—UTT is run for the fifth time, it produces the display 598, which mistakenly assumes the next word to be recognized starts with an "n" sound.

In the example of FIG. 27, once display 598 is placed on the screen, the operator makes a response 600 by speaking the response word "restrict—E—F". He does this while the program is running a LOAD2 recognition on the current portion of speech against the entire system vocabulary. As a result, the next call to "check—for—response()"during that recognition, sets "key" to 'e' and "keystring" to "ef" and calls "handle—response()". Then lines 21–25 of "handle—response()" erases display 598, set "response—time—limit" to NULL, add "ef" to the previously empty initial string, set "restart" to two, and cause a return to lines 27 and 28 of FIG. 17. Since "restart" is two, line 28 jumps to LOAD2, where it loads a prefilter vocabulary of those system vocabulary words starting with "ef" ands runs recognition of the current portion of speech against that vocabulary. With this restricted vocabulary, the LOAD2 recognition correctly determines the best scoring word to be "efficient". Since the last call to "handle_response()" erased the last display 598, lines 31 through 39 place the display 602 of the single word choice "efficient" on the screen and set a response time.

In the example of FIG. 27, the operator makes no response to display 602, since it is correct. This causes the program to advance to TIME_OUT one line 44.5 of FIG. 17. TIME_OUT calls "handle_response()" with "key" equal '1'. This sets "word" to the word choice "efficient", produces "efficient" as an output to the application program, and sets "wordstart" to "efficient's" corresponding "wordend". Then TIME_OUT jumps to NEW_UTT for the recognition of another word.

The sixth time the program advances to NEW_UTT, NEW_UTT resets "response_time_limit", clears the initial string, gets a prefilter vocabulary of the one thousand words considered most likely to follow "efficient" and calls "get_frames()". At this time "wordstart" is within a frame block of "bigwritepr", because "efficient's" wordend lies in the second one hundred and fifty frame, frame block of buffer 102 and "bigwriteptr" points to the start of what will be that buffer's third frame block. As a result, liness 8-14 of FIG. 18 cause the next three seconds of audio stored on audio file on disk 428 to be converted into frames and written into the big buffer at the current "bigwriteptr". These lines also cause three seconds of speech, corresponding to the current portion of speech starting at the end of "efficient", to be played aloud for the operator to hear.

Once "get_frames()" returns, lines 14-16 of FIG. 17 run recognition of the current portion of speech to be recognized against NEW_UTT's current thousand word vocabulary. Line 17 makes the display 606, shown in FIG. 27, of the resulting word choices, and line 18 sets the response time. In the example of FIG. 27, it is assumed that the correct word "algorithm" is not in the one thousand word vocabulary just used in NEW_UTT, and thus the display 606 does not contain the correct word choice. For this reason the operator types the 'a' key followed by the '1' key.

In the example of FIG. 27, the 'a' key is typed while LOAD2 is performing recognition on the current portion of speech against the entire system vocabulary. The next time line 26 of FIG. 17 calls "check_for_response()", lines 23-26 of FIG. 19 set "key" to 'a' and "keystring" to "a" and then call "handle_response()". Lines 21-25 of "handle_response()" set "response_time_limit" to NULL, erases the current display 606, adds 'a' to the previously empty initial string, set "restart" to 2, and cause a return to lines 27 and 28 of FIG. 17. Then line 28 jumps to LOAD2, which set the prefilter vocabulary equal to all words in the system vocabulary starting with 'a'. Once this is done, lines 22-30 of FIG. 17 begin recognition against that prefiltered vocabulary.

At this point it is assumed that the operator types the '1' character to further limit vocabulary and speed up recognition. The next time the LOAD2 recognition calls "check_for_response()", that function calls "handle_response()" with "key" set to '1' and "keystring" set to "1". This sets "response_time_limit" to NULL, "restart" to two, and the initial string to "a1". Thus when the program returns to FIG. 17, line 28 jumps to LOAD2 again. This time line 21 set the prefilter vocabulary to all system vocabulary words starting with "a1". Lines 22-30 run recognition against this alphabetically filtered vocabulary. Then, since all previous word choices have been erased, lines 31 through 39 make a display 608 of the resulting words choices and set a response time. In the example of FIG. 27, the operator makes no response to display 608 because its first word choice is the correct word "algorithm". Thus the program advances to TIME_OUT, causing "algorithm" to be passed to the application program as the desired output.

It can be seen that the second preferred embodiment of the present invention enables recognition to be performed upon a plurality of pre-recorded spoken words, including continuously spoken words. It presents an operator with the word choices it produces for a given portion of prerecorded speech, enabling the operator to select which of displayed word choices is the intended word, as well as enabling the operator to rerun recognition of the given portion of prerecorded speech against an alphabetically filtered vocabulary. It also enables the operator to make word and alphabetic filtering choices by voice, as well as by key.

It can be seen that new and improved speech recognition systems have been described above which have significant advantages over speech recognition devices used in the prior art. It should be appreciated that modifications to the described embodiments may be made by those of ordinary skill applying the principles of the present inventions to make such modified embodiments. For example, the preferred embodiments described above are both frame based systems, but it will be clear to those skilled in the speech recognition arts that many of its aspects could be used with other types of speech recognition systems, such as feature extraction systems. Similarly it should be understood that the present invention could be used with frame based systems which use more than eight frame parameters, or which use other types of frame parameters, such as those derived from linear predictive coding rather than fast fourier transform spectral analysis.

Accordingly the present invention should not be considered to be limited by the description herein of the preferred embodiments, but rather should be interpreted in accordance with the following claims.

What I claim is:

1. A speech recognition system comprising:
   means for receiving an acoustic description of a portion of speech to be recognized;
   means for storing an acoustic description of each word in a system vocabulary;
   recognition means for making a determination of which one or more words of a recognition vocabulary, comprised of one or more words from said system vocabulary, most probably correspond to said portion of speech, said recognition means including comparing means for determining how closely the acoustic description of said portion of speech compares to the acoustic descriptions of words from said recognition vocabulary; and
   first-pass means for causing said recognition means to start to perform a first recognition of said portion of speech using a first such recognition vocabulary;
   control-input means for enabling an operator to input a string of one or more selected characters if he or she so desires; and re-recognition means responsive to the input of a string of characters through said control-input means for causing said recognition means to start to perform a second recognition of said portion of speech using a second such recognition vocabulary, said re-recognition means including alphabetic filtering means for selecting a sub-vocabulary from said system vocabulary to be used as said second recognition vocabulary, said filtering means including means, responsive to said control-input means, for causing said sub-vocabulary to include an increased percent of vocabulary words specified as a function of said string of one or more characters input through said control-input means.

2. A speech recognition system as described in claim 1, wherein
said control-input means includes means for enabling an operator to input a string of one or more selected alphabetic letters as said string; and
said alphabetic filtering means includes means for responding to the input through said control-input means of a string of one or more alphabetic letters by causing a majority of the words in the sub-vocabulary selected by said alphabetic filtering means to start with said string.

3. A speech recognition system as described in claim 2, wherein:
said control-input means further includes means for enabling an operator to indicate that said second recognition is to be performed against a vocabulary which is not alphabetically filtered; and
said re-recognition means further includes means responsive to said indication by said operator for selecting as said second recognition vocabulary a vocabulary which does not contain a majority of words starting with any one initial string.

4. A speech recognition system as described in claim 1, wherein:
said control-input means include means for enabling an operator to input said string of one or more characters while said recognition means is performing said first recognition; and
said re-recognition means includes means for responding to the input of a string of one or more characters during the performance of the first recognition by stopping the performance of the first recognition, by causing said alphabetic filtering means to select a sub-vocabulary as a function of said string, and by causing said recognizer to start performing said second recognition using the second recognition vocabulary selected by said alphabetic filtering means.

5. A speech recognition system as described in claim 1, wherein:
said system further includes means for displaying to an operator, after said first recognition has made its determination with regard to said first vocabulary, the one or more words which the recognition means determines most probably correspond to said portion of speech;
said control-input means includes means for enabling an operator to input said string of one or more characters after said means for displaying displays said one or more words;
said re-recognition means includes means for responding to the input through said control-input means of a string of one or more characters after said display means displays said one or more words by causing said alphabetic filtering means to select a sub-vocabulary as a function of said string, and by causing said recognizer to start performing said second recognition using the second recognition vocabulary selected by said alphabetic filtering means.

6. A speech recognition system as described in claim 1, wherein:
said control-input means includes means for enabling an operator to input a string of one or more selected alphabetic letters as said string;
said alphabetic filtering means includes means for responding to a string of one or more alphabetic letters input through said control-input means by selecting a sub-vocabulary for use as said second recognition vocabulary which includes an increased percent of vocabulary words which start with that string
said control-input means includes means for enabling an operator to add one or more selected additional alphabetic letters to the end of a string of one or more letters input by the operator after that string has been input, and said re-recognition means has caused its alphabetic filtering means to select a first sub-vocabulary based on that string, and has caused said recognition means to start performing said second recognition using said first sub-vocabulary as said second recognition vocabulary; and
said re-recognition means includes means for responding to the input of additional letters to said string through said control-input means by causing said alphabetic filtering means to select a second sub-vocabulary including an increased percentage of words starting with the new string formed by adding said one or more additional letters to the said string, and for causing said recognition means to start to perform an additional recognition of said portion of speech using said second sub-vocabulary as a third recognition vocabulary.

7. A speech recognition system as described in claim 6, wherein said re-recognition means further includes means for causing said recognition means to abort said second recognition using said first sub-vocabulary before it causes said recognition means to start performing said additional recognition using said second sub-vocabulary.

8. A speech recognition system as described in claim 1, wherein said control-input means includes a keyboard and means for enabling an operator to input characters by the pressing of keys on said keyboard.

9. A speech recognition system as described in claim 1, wherein:
said control-input means includes means for enabling an operator to input a string of one or more selected alphabetic letters plus a control character as said string;
said speech recognition system further includes output producing means for selecting one of the one or more words determined by said recognition means in either said first recognition or second recognition to most probably correspond to said portion of speech and for producing a string of one or more letters corresponding to that word as an output; and
said speech recognition system further includes means for responding to the input through said control-input means of said string of one or more letters plus said control character by causing said output producing means to produce said string of letters as said output.

10. A speech recognition system as described in claim 1, wherein:
said means for receiving an acoustic description of a portion of speech to be recognized includes means for storing an acoustic description of both a first and a second portion of speech to be recognized;
said means for storing an acoustic description of each word in a system vocabulary includes means for storing an acoustic description of a plurality of control words;
said recognition means includes means for storing an associated character string for each of said control words;
said control-input means includes means for causing said recognition means to make a determination of which, if any, one or more control words most probably correspond to said second portion of speech and to use said character string associated with said one or more control words as said string of one or more characters input by said operator through said control-input means for purposes of affecting the recognition of said first portion of speech.

11. A speech recognition system in claim 1 wherein said speech recognition system is a discrete utterance recognition system.

12. A speech recognition system as described in claim 1 wherein:
said means for receiving an acoustic description of a portion of speech to be recognized includes means for recording an extended acoustic description of a plurality of successive spoken words;
said recognition means includes means for making a determination of which one or more words of a recognition vocabulary most probably correspond to each of a plurality of successive segments of said extended acoustic description.

13. A speech recognition system as described in claim 12 wherein:
said means for recording an extended acoustic description of a plurality of spoken words include means for recording said speech in a form from which a humanly understandable audio playback of that speech can be made;
said system further includes means for playing back an audio representation of one or more of said successive segments so that a human operator can hear them in conjunction with the recognition by said recognition means of those segments.

14. A speech recognition system as described in claim 12 wherein:
said means for recording an extended acoustic description includes means for recording an extended acoustic description of a plurality of continuously spoken words;
said recognition means includes means for making a determination of which one or more words from a recognition vocabulary most probably correspond to successive segments of continuous speech recorded in said extended acoustic description.

15. A speech recognition system comprising:
means for recording an extended acoustic description of a plurality of successive spoken words;
means for storing an acoustic description of each word in a recognition vocabulary;
recognition means for making a determination of which words of said recognition vocabulary most probably correspond to a given portion of speech recorded in said extended acoustic description, said recognition means including comparing means for determining how closely the acoustic description of each such portion of speech compares to the acoustic descriptions of words from said recognition vocabulary;
choice display means for displaying a plurality of the words determined by said recognition means to most probably correspond to each successive portion of speech to be recognized;
word selection means for enabling an operator to select which of said plurality of displayed words corresponds to said given portion of speech; and
said speech recognition system further including means, responsive to a selection by said selection means of a displayed word as corresponding to said given portion of speech, for determining how much of said extended acoustic description corresponds to said selected word and supplying a successive portion of the extended acoustic description which follows that associated with the selected word to said recognition means as the next portion of speech to be recognized, and for causing said recognition means to make a determination of which words of said recognition vocabulary most probably correspond to said next portion of speech to be recognized.

16. A speech recognition system as described in claim 15 wherein
said means for recording an extended acoustic description of a plurality of spoken words include means for recording said speech in a form from which a humanly understandable audio playback of that speech can be made; and
said system further includes means for playing back an audio representation of a portion of speech so that a human operator can hear it in conjunction with the recognition by said recognition means of that portion of speech.

17. A speech recognition system as described in claim 15 wherein:
said word selection means includes means for causing said speech recognition system to wait for the operator to select one of the displayed words associated with a given portion of speech before said recognition means make a determination with regard to said successive portion of speech and said choice display means displays the words determined by said recognition means to most probably correspond to said successive portion of speech.

18. A speech recognition system as described in claim 15 wherein,
said recognition means includes means for making a determination of which single word of said recognition vocabulary most probably corresponds to a portion of speech to be recognized;
said word selection means includes means for selecting said most probably corresponding word from among said displayed words when the operator fails to select one of the displayed words within a given response time.

19. A speech recognition system as described in claim 15 wherein:
said means for recording an extended acoustic description includes means for recording an extended acoustic description of a plurality of continuously spoken words;

said recognition means includes means for making a determination of which one or more words from said recognition vocabulary most probably correspond to successive portions of said continuously spoken words recorded in said extended acoustic description.

20. A speech recognition system as described in claim 19 wherein said recognition includes:

means for time aligning the acoustic description of at least said selected word against the acoustic description of said continuously spoken words, and for determining the time in the acoustic description of said continuously spoken words at which the time alignment of said selected word most probably ends; and means responsive to said selection means for using the time in said acoustic description of said continuously spoken words at which the time alignment of the displayed word selected by the operator most probably ends as the starting time of the next successive portions of said extended acoustic description to be recognized.

21. A speech recognition system for recognizing a succession of words comprising:

means for receiving an acoustic description of a portion of speech to be recognized;

means for storing an acoustic description of each word in a system vocabulary;

recognition means for making a determination of which one or more words of a sub-vocabulary comprised of one or more words of said system vocabulary most probably correspond to said portion of speech, said recognition means including comparing means for determining how closely the acoustic description of said portion of speech compares to the acoustic descriptions of words from said sub-vocabulary;

means for storing a body of text comprised of one or more words and for associating the portion of speech to be recognized with a location in that text which can be preceded by one or more of said words first-pass means for causing said recognition means to make a first determination of which one or more words of a first sub-vocabulary of said system vocabulary most probably correspond to said portion of speech, said first pass-means including language model filtering means for selecting said first sub-vocabulary as a function of the sequence of one or more words preceding the location associated with the speech to be recognized in said body of text; and means for displaying said one or more words of said first sub-vocabulary selected by said first determination as most probably corresponding to said portion of speech;

re-recognition means for causing said recognition means to start making a second determination of which one or more words of a second sub-vocabulary, which can be different from said first sub-vocabulary, most probably correspond to said portion of speech;

control-input means for enabling an operator to input a command to control the re-recognition process; and means for aborting, in response to in input of said command by said operator, said second determination of which one or more words of said second sub-vocabulary most probably correspond to said portion of speech.

22. A speech recognition system as described in claim 21 wherein said language model filtering means selects said first sub-vocabulary so that it is comprised substantially of the words from said system vocabulary which are the most likely words to occur following said sequence of one or more words preceding the location associated with the speech to be recognized in said body of text, according to a probablistic model of what words are likely to occur after given other words in a given type of speech modeled by said probabilistic model.

23. A speech recognition system as described in claim 22 wherein said language model filtering means includes means for selecting said first sub-vocabulary based on the word preceding the location associated with said speech to be recognized in said body of text.

24. A speech recognition system comprising:

means for receiving an acoustic description of a portion of speech to be recognized;

means for storing an acoustic description of each word in a system vocabulary;

recognition means for making a determination of which one or more words of a recognition vocabulary which is a sub-vocabulary consisting of one or more words of said system vocabulary most probably correspond to said portion of speech, said recognition means including comparing means for determining how closely the acoustic description of said portion of speech compares to the acoustic descriptions of words from said recognition vocabulary;

first-pass means for causing said recognition means to first make a first determination of which one or more words of a first such recognition vocabulary most probably correspond to said portion of speech;

re-recognition means for causing said recognition means to start to make a second determination of which one or more words of a second such recognition vocabulary most probably correspond to said portion of speech; and means for aborting said second determination in response to an abort signal from an operator of the system.

25. A speech recognition system as described in claim 24 wherein said second vocabulary is substantially larger than said first vocabulary.

26. A speech recognition system as described in claim 24 further including:

means for displaying a plurality of those words from said first vocabulary determined by said recognition means to most probably correspond to said portion of speech, and for then adding to the said display of words from the first vocabulary additional words from said second vocabulary determined by said recognition means to most probably correspond to said portion of speech; and means for enabling an operator to select which of said currently displayed words is the word corresponding to said given portion of speech.

27. A speech recognition system as described in claim 24 further including:

means for displaying a plurality of those words from said first vocabulary determined by said recognition means to most probably correspond to said portion of speech;

means for displaying a plurality of those words from said second vocabulary determined by said recognition means to most probably correspond to said portion of speech upon the receipt of a second display command;

means for enabling an operator to selectively indicate that a selected one of said words displayed from said first vocabulary is the word corresponding to said portion of speech, or to cause the display of said plurality of words from said second vocabulary by generating said second display command; and means for enabling an operator to selectively indicate that a selected one of said words displayed from said second vocabulary is the word corresponding to said portion of speech.

28. A speech recognition system as described in claim 24 wherein:

said means for receiving an acoustic description of a portion of speech to be recognized includes means for receiving an acoustic description of each successive utterance spoken by an operator of the system;

said speech recognition system is a discrete utterance recognition system and said means for aborting said second determination includes means for detecting the beginning of another such utterance after the utterance associated with said portion of speech for which said first determination is made and for treating such a detection as said abort signal.

29. A speech recognition system as described in claim 24 further including:

means for displaying a plurality of those words from said first vocabulary determined by said first determination to most probably correspond to said portion of speech;

means for enabling an operator to make a selection of which of said displayed words is the word corresponding to said given portion of speech; and in which said means for aborting said second determination consists of means for detecting that said operator has made such a selection and for treating said selection as said abort signal.

* * * * *